(12) United States Patent
Matsumoto et al.

(10) Patent No.: US 6,384,859 B1
(45) Date of Patent: May 7, 2002

(54) METHODS FOR CREATING AN IMAGE FOR A THREE-DIMENSIONAL DISPLAY, FOR CALCULATING DEPTH INFORMATION AND FOR IMAGE PROCESSING USING THE DEPTH INFORMATION

(75) Inventors: Yukinori Matsumoto, Tsukuba; Hajime Terasaki, Ushiku; Kazuhide Sugimoto, Tsukuba; Masazumi Katayama, Toyohashi; Tsutomu Arakawa, Ryugasaki; Osamu Suzuki, Matsudo, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 08/622,047

(22) Filed: Mar. 26, 1996

(30) Foreign Application Priority Data

Mar. 29, 1995 (JP) ............... 7-096248
Sep. 8, 1995 (JP) ............... 7-256772
Sep. 8, 1995 (JP) ............... 7-257141

(51) Int. Cl.$^7$ ......................... H04N 13/00; H04N 15/00
(52) U.S. Cl. ........................................ 348/43
(58) Field of Search .................. 348/42, 43, 51, 348/55, 154, 402, 413, 420, 421, 422; 382/154; 358/88; 350/320; H04N 13/00, 15/00

(56) References Cited

U.S. PATENT DOCUMENTS

| 4,754,327 A | * | 6/1988 | Lippert ..................... 358/88 |
| 4,873,572 A | * | 10/1989 | Miyazaki et al. ............ 358/98 |
| 4,895,431 A | * | 1/1990 | Tsujiuchi et al. ........... 350/320 |
| 4,925,294 A | * | 5/1990 | Geshwind et al. ........... 353/57 |
| 4,966,436 A | * | 10/1990 | Mayhew et al. ............ 350/143 |

(List continued on next page.)

FOREIGN PATENT DOCUMENTS

| EP | 714077 | 7/1996 | |
| JP | 04-004476 | 1/1992 | |
| JP | 4-504333 | * 7/1992 | ........... H04N/13/00 |

(List continued on next page.)

OTHER PUBLICATIONS

Kiyohide Satoh, et al., "Passive Depth Acquisition for 3D Image Displays", IEICE Transactions on Information and Systems. pp. 949–957.

(List continued on next page.)

*Primary Examiner*—Nhon T Diep
(74) *Attorney, Agent, or Firm*—Hogan & Hartson, L.L.P.

(57) ABSTRACT

A method is proposed for automatically obtaining depth. information from a 2-D motion image, so as to create an image for a 3-D display. Further, methods are proposed for selecting appropriate frames for the calculation of the depth information, or discontinuing the calculation, and for conducting image., processing using the depth information. Examples of various types of image processing can be listed as including the creation of a viewfinder image seen from a different point, natural scaling operations to an image area, and separation of a desired image area. First, a motion information of an object on a screen is extracted by block matching or the like. Second, the actual movement of the object in the 3-D world is calculated. Since the viewfinder image is a projection of a 3-D space, it is possible to obtain the original 3-D movement of the object, based on the movements of a plurality of representative points through an inverse transformation, the representative points being provided in the viewfinder image. Resultantly, 3-D coordinates of this object are identified, so that depth information of the object is obtained. Afterwards, a parallax is calculated based on the depth information, so as to create right and left eye images from the input viewfinder image. Alternatively, image processing, such as separation of an object having a depth within a predetermined range, is carried out based on the depth information.

13 Claims, 33 Drawing Sheets

U.S. PATENT DOCUMENTS

| | | | | |
|---|---|---|---|---|
| 5,173,772 A | * | 12/1992 | Choi | 358/105 |
| 5,175,616 A | * | 12/1992 | Milgram | 358/88 |
| 5,432,543 A | * | 7/1995 | Hasegawa | 348/45 |
| 5,461,423 A | * | 10/1995 | Tsukagoshi | 348/416 |
| 5,500,671 A | * | 3/1996 | Andersson et al. | 348/15 |
| 5,506,703 A | * | 4/1996 | Suzuki et al. | 359/17 |
| 5,510,832 A | * | 4/1996 | Garcia | 348/56 |
| 5,530,774 A | * | 6/1996 | Fogel | 382/154 |
| 5,561,475 A | * | 10/1996 | Jung | 348/699 |
| 5,671,343 A | * | 9/1997 | Kondo et al. | 382/154 |
| 5,717,415 A | * | 2/1998 | Iue et al. | 348/8 |
| 5,724,435 A | * | 3/1998 | Malzbender | 382/154 |
| 5,739,844 A | * | 4/1998 | Kuwano et al. | 348/43 |
| 5,757,522 A | * | 5/1998 | Kulick et al. | 359/9 |
| 5,801,760 A | * | 9/1998 | Uomori | 348/47 |

FOREIGN PATENT DOCUMENTS

| | | | | | |
|---|---|---|---|---|---|
| JP | 5-68268 | * | 3/1993 | | H04N/13/00 |
| JP | 5-91545 | * | 4/1993 | | H04N/13/00 |
| JP | 05-250459 | | 9/1993 | | |
| JP | 5308630 | | 11/1993 | | |
| JP | 06-203163 | | 7/1994 | | |
| JP | 07-162744 | | 6/1995 | | |
| JP | 5-134655 | * | 5/1999 | | G09G/5/36 |
| WO | 8804804 | | 6/1988 | | |

OTHER PUBLICATIONS

Demetri Terzopoulos, "The Computation of Visible–Surface Representations", IEEE Transactions on Pattern Analysis and Machine Intelligence, Jul. 1988, No. 4.

* cited by examiner

REPRESENTATIVE POINTS    CORRESPONDING POINTS

RELATIVE POSITIONAL EVALUATION OF CORRESPONDING POINTS

IMPROVEMENT RESULT OF CORRESPONDING POINTS

FRAME t 50  50  50

VIEWFINDER IMAGE IN FRAME t

VIEWFINDER IMAGE IN FRAME t'

VIEWFINDER IMAGE IN FRAME t WITH A GRID

VIEWFINDER IMAGE IN FRAMES t' WITH
CORRESPONDING POINTS

IMPROVED POSITIONS OF CORRESPONDING
POINTS FROM FIG. 22

DEPTH INFORMATION

RIGHT IMAGE BASED ON DEPTH INFORMATION

LEFT IMAGE BASED ON DEPTH INFORMATION

ORIGINAL VIEWFINDER IMAGE

VIEWFINDER IMAGE FROM A NEW VIEWPOINT

MAGNIFIED VIEWFINDER IMAGE

MODIFIED VIEWFINDER IMAGE

METHODS FOR CREATING AN IMAGE FOR A THREE-DIMENSIONAL DISPLAY, FOR CALCULATING DEPTH INFORMATION AND FOR IMAGE PROCESSING USING THE DEPTH INFORMATION

BACKGROUND OF THE INVENTION

1. Field of the Invention

The present invention relates to methods for creating an image for a three-dimensional display (hereinafter referred to as a 3-D display), for calculating depth information, and for image processing using the depth information. The method for creating an image for a 3-D display particularly relates to a method for creating a pseudo-viewfinder image shot by a multi-eye camera (a stereo image) from a viewfinder image shot by a monocular camera. The method for calculating depth information relates to a method for obtaining a distance between an object and a viewer, which is applicable to practice the method for creating an image for a 3-D display. The method for image processing using the depth information relates to applications including the creation of an image for a 3-D display and the suspending of creation of an image for a 3-D display, an enhanced display, or the like.

2. Description of the Prior Art

[1] Creation of an Image for a 3-D Display

In fields related to television techniques for creating a 3-D image (a pseudo stereoscopic vision) through the detection of a movement of a 2-D motion image have been known. One typical example of such a technique is a 3-D display employing a time difference method, the principal of which will be described with reference to FIGS. 1 to 3.

In a scene where an object moves from left to right while the background stays still, as shown in FIG. 1, by reproducing respective images for right and left eyes (hereinafter respectively referred to as right and left eye images) so as to have a predetermined lapse of time between them, as shown in FIG. 2, a parallax θ is caused, as shown in FIG. 3. "A parallax" or "a binocular disparity" is defined as an angular difference between sight vectors directed at one point from right and left eyes, respectively. In FIG. 1, since a viewer perceives the car as being closer than the background due to parallax, a pseudo stereoscopic vision is achieved. When the object, the car in this case, moves in the opposite direction, respective images should be reproduced such that the one for a right eye is reproduced earlier than the one for a left eye by a predetermined time, contrary to the example shown in FIG. 3.

JP Publication No. Sho 55-36240 discloses a display apparatus for a stereoscopic image using depth information, in which the apparatus receives only an image signal shot from one basic direction (that is, a 2-D motion image) among signals from multiple directions and a signal containing the depth information of an object, so as to reproduce within the apparatus the original viewfinder image shot from multiple directions. The purpose of the apparatus is to reduce a transmission bandwidth. The apparatus incorporates a variable delay circuit for causing a time delay while controlling the extent thereof according to depth information. The time delay results in a parallax. According to an output signal from the circuit, image signals are. reproduced for right and left eyes. In this way, a pseudo stereoscopic image is displayed. This publication discloses, as a preferred embodiment of the disclosed apparatus, (1) a device for displaying a pseudo stereoscopic image for a viewer by respectively supplying right and left eye images to two CRT's, which are situated forming a predetermined angle with a hall' mirror, and (2) a device for displaying a pseudo stereoscopic image for a viewer even if the viewer moves in a horizontal direction, using a lenticular lens fixed to a display screen.

However, the above apparatus works on the condition that depth information is supplied externally. Therefore, if it only receives a 2-D motion image, the apparatus cannot create a pseudo stereoscopic image.

JP Application Laid-Open No. Hei 7-59119 also discloses an apparatus for creating a pseudo stereoscopic image based on a 2-D motion image. The apparatus comprises a detection circuit for detecting a motion vector from a supplied 2-D motion image, and a delay circuit for delaying either a right or a left image according to the motion vector. The delay causes a parallax. This application discloses, as a preferred embodiment of the disclosed apparatus, a head mounted display (HMD), which is a glasses type display for supplying different images to right and left eyes. Through the HMD, a viewer can see a pseudo stereoscopic image.

In this apparatus, however, since the extent of delay is determined according to the magnitude of a motion vector, any object moving at high speed appears to be closer to the viewer, resulting in an unnatural stereoscopic view, which is discordant to the effective distance between the viewer (or the camera) and the object (that is, a depth).

JP Laid-Open Application No. Sho 60-263594 also discloses an apparatus for displaying a pseudo stereoscopic image using a time difference method, in which the apparatus displays right and left images alternatively for every field, so that they are seen alternatively via shutter glasses for every field, as the shutter glasses alternatively open their right and left eyes. This application further discloses a method for generating a stereoscopic effect by providing a longer time difference between right and left images when an object moves at low speed. However, since this apparatus also does not operate based on depth information, it is not really possible for an accurate pseudo stereoscopic image to be created and thus displayed.

"PIXEL" (No. 128), a magazine, issued on May 1, 1993 describes in pages 97 to 102 a pseudo stereoscopic image system using depth information. In the system, an object is first displayed as a gray-scale image where the gray-scale level corresponds to the depth, and then based on the gray level, the. appropriate parallax is calculated in terms of the number of pixels, so that right and left images are created to be seen via shutter glasses. However, the perspective image is manually created and a technique for automating the creation is not disclosed.

National Publication No. Hei 4-504333 (WO88/04804) discloses a method for achieving a pseudo stereoscopic image using depth information. The method comprises steps of dividing a 2-D motion image into some areas, for giving the divided areas depth information, so as to provide each of the areas with a parallax, and for creating a pseudo stereoscopic image. However, the depth information is manually supplied and a technique for automating the supply is not disclosed.

In a research field called "Computer Vision," a study has been conducted into a method for estimating a 3-D structure and movement of an object. Concretely speaking, the study, which is aimed at self-control of a robot, relates to acquisition of an accurate distance from a viewpoint to an object by either shooting the object using a stereo camera (a multi-eye camera), or using a monocular camera while moving it. Several aspects oil this technology are described in a report, entitled "1990 Picture Coding Symposium of Japan (PCSJ90)," for example, on page 57.

[2] Creation of Depth Information

Computer Vision would enable detection of the depth of an object. However, in the calculation of depth information, which is based on 2-D motion information, suitable images are not always supplied for the calculation. If the calculation is continued even with unsuitable images supplied, serious errors are likely to be caused. That is, if depth information is obtained from such unsuitable images, and then used for the creation of a stereoscopic image, it may be quite likely that the thus created stereoscopic image will be unnatural, i.e., exhibiting such anomalies as a person in the distance appearing closer than a person who actually is closer.

It is to be noted that the idea of obtaining depth information through understanding of a corresponding relationship between frames has been known. For example, JP Application Laid-Open No. Hei 7-71940 (which corresponds to U.S. Pat. No. 5,475,422) mentions, as a prior art, (1) a technique for relating a point or a line between two images shot by a stereo camera, so as to estimate the position of the point or line in actual space (the 3-D world), and (2) a technique for shooting an object on a camera while moving it, so as to obtain its sequential viewfinder images for tracing the movements of a characteristic point on the sequential viewfinder images, and thereby estimating the position of each characteristic point in actual space.

[31 An Image Processing Method Using Depth Information

A method for controlling the movement of a robot using depth, information is known, such as the foregoing Computer Vision. A, method for creating a pseudo stereoscopic image using depth information is also known, such as is disclosed in the foregoing JP Publication No. Sho 55-36240.

On the other hand, a method for using depth information in image processing other than the creation of a pseudo stereoscopic image has scarcely been proposed.

SUMMARY OF THE INVENTION

The first object of the present invention relates to the creation of an image for a 3-D display, as described in the above [1]. In defining the object of the present invention, the inventor draws attention to the fact the all of the foregoing techniques for creating a pseudo stereoscopic image have at least one of the following problems to be solved:

1. An accurate stereoscopic image based on depth information is not created. Instead, a mere 3-D effect is provisionally created according to the extent of movement. Further, since a parallax needs to be created using a delay in time (a time difference), horizontal movement of an object is required as a premise of the creation, which should constitutes a fundamental. restriction.

2. As it is not automated, the process for obtaining depth information from a 2-D motion image requires an editing process. Thus, a stereoscopic image cannot be output in real time upon input of the 2-D motion image.

Therefore, the first object of the present invention is to create an accurate stereoscopic image, based on depth information, by applying the foregoing technique relating to a computer vision to an image processing field including technical. fields related to television.

In order to achieve this object, according to the present invention, depth information is extracted from a 2-D motion image, based on which an image for a 3-D display is created. This is applying a technique related to a computer vision to a technical field relating to an image display. According to one aspect of the present invention, depth information is obtained through the following processes: that is, the movement of a 2-D motion image is detected; a relative 3-D movement between the scene and the shooting viewpoint of the 2-D motion image is calculated; and relative distances from the shooting viewpoint to the respective image parts of the 2-D motion image are calculated, based on the relative 3-D movement and the movements of the respective image parts. Based on the thus obtained depth information, a pseudo stereoscopic image is created.

This aspect of the present invention can be differently described as a depth being obtained through the following processes: that is, a plurality of viewfinder frames (hereinafter referred to as frames) are selected from a 2-D motion image to be processed; and a relative positional relationship in the actual 3-D world of the respective image parts is identified based on a 2-D positional displacement between the frames. In other words, in order to determine the depth, 3-D movements of the respective image parts are calculated based on the 2-D positional displacement, based on which positional coordinates of the respective image parts in the 3-D world are calculated, according to the principle of triangulation. A frame is a unit for image processing, that is, a concept including a frame picture or a field picture in MPEG, and the like.

Regarding a 2-D motion image, a plurality of viewfinder frames are hereinafter referred to as "different-time frames," as they are shot at different times. (In the following description of a multi-eye camera, a plurality of frames which are simultaneously shot are referred to as "same-time frames.") A positional displacement on a frame plane is referred to as "a 2-D positional displacement." In this aspect of the present invention, where different-time frames are discussed, "a 2-D positional displacement" means a change caused along with a lapse of time, that is, a movement. (On the contrary, "a 2-D positional displacement" of same-time frames means a positional difference among a plurality of frames.)

The second object of the present invention relates to the calculation of depth information, as described in the above [2]. That is, the second object of the present invention is to propose a method for obtaining a correct corresponding relationship among a plurality of images, so as to calculate accurate depth information, for selecting an image to be input appropriate for the calculation, and for discontinuing the calculation of depth information when any inconvenience occurs, such as could cause an unnatural pseudo stereoscopic image to be created. Further, the present invention aims to propose methods for effectively determining corresponding and characteristic points, and for searching and tracing points with a high accuracy.

In order to achieve this object, according to the present; invention, two frames with appropriately large movements between them are selected from a 2-D motion image, so that depth information is obtained from the two frames. According to this; aspect of the invention, it is possible to obtain a good calculation result, with pre-selection of frames which may facilitate the calculation. A judgement as to whether frames have appropriately large movement or not may be based on the extent or variance of movement of a characteristic point.

According to another aspect of the invention, with a representative point provided in a reference frame, the similarity of images is evaluated between an image area including a characteristic point in the other frame (hereinafter referred to as an object frame), and an image area including the representative point in the reference frame. A characteristic point is a candidate for a corresponding point subject to all evaluation, the candidate being arbitrarily determined. Then, the relative positional acceptability between the characteristic point and the other characteristic point is evaluated. That is, a judgement is made as to whether the relative positional relationship between the characteristic point and the other characteristic point is reasonable or acceptable with respect to being determined as the same as the relative positional relationship between the representative point and the other representative point, respectively corresponding to the characteristic points. When both evaluations result in a favorable score, the characteristic point is tentatively determined as a corresponding point of the representative point. Subsequently, a best point is searched for where each of the evaluations yield the best result, by moving one corresponding point within a predetermined search area, while assuming that all the other corresponding points are fixed (this method hereinafter being referred to as a fixed searching method). The best position, which has been found during the search, is determined as a new position of the corresponding point. All corresponding points are sequentially subjected to this search and the. positional change. Afterwards, depth information is obtained based on a positional relationship between a representative point and its corresponding point, the corresponding point having been obtained through the above mentioned series of processes.

Conventionally, the similarity of images has been evaluated by block matching or the like. In this invention, on the other hand, by including an additional evaluation on the relative positional evaluation, the corresponding relationship between frames can be more accurately detected. The accuracy can be. further improved through iterative calculations.

According to one aspect of the present invention, the similarity of the images is evaluated by block matching which is modified such that the similarity is correctly evaluated to be highest when the blocks including the identical object are tested, regardless of shooting conditions (hereinafter referred to as biased block matching). As to same-time frames, a certain color deflection tends to occur due to characteristic differences of a plurality of cameras. As to different-time frames, the same problem will arise due to changing weather from time to time, as this causes a change in brightness of a viewfinder image. After correction is made to solve such problems, the similarity of images is transformed to be expressed in the form of a geometrical distance, which is a concept for judging the acceptability of relative positions. Then, the relative positional acceptability and the transformed similarity are combined together to be used for a general judgement on the evaluation results. In this case, biased block matching may be conducted within a correction limitation, which is pre-determined depending on a distance between the reference and object frames. That is, when the distance is larger, a larger correction limitation is set accordingly.

A correction for off-setting a change in brightness is disclosed in JP Laid-Open No. Hei 5-3086630. However, the correction is applicable only to cases of facing-out or facing-in (a consistent changing in brightness), but not to a partial changing in brightness.

According to another aspect of the invention, depth information is obtained through the following processes: that is, a plurality of representative points are provided in a reference frame; a plurality of corresponding points of the representative points are determined in an object frame, so that each corresponds to a respective one of the representative points; and a positional relationship between at least a characteristic point among the representative points, and its corresponding points is obtained. As a characteristic point, a point whose position moves steadily among a plurality of different-time frames is selected, because such a point is considered to be accurately traced.

Likewise, according to another aspect of the present invention, if a point, whose displacement between same-time frames is substantially consistent or changes substantially consistently, also shows similarly consistent movement or change in movement between other same-time frames shot at a close but different time from the above, such a point may be selected as a characteristic point.

According to a further aspect of the present invention, depth information is obtained from the following processes: that is, a plurality of representative points are provided in a reference image; a plurality of corresponding points of the representative points are determined in the other image; and a positional relationship between the representative point and its corresponding point is obtained; depth information is calculated according to the positional relationship, in which the calculation of the depth information is discontinued when an insufficient number of characteristic points are established among the representative points or the movements of the characteristic points are too small, because it is then very unlikely that a positional relationship between viewfinder images will be obtained with a high accuracy.

Two conceptually different corresponding points exist, that is, a true corresponding point and a computed corresponding point. In principle, each representative point has a sole corresponding point, eliminating the possibility of the existence of any other corresponding points in any other positions. This; idealistic sole corresponding point is the true corresponding point. On the other hand, a corresponding point determine through calculations for image processing does not necessarily coincide with the true corresponding point. This is the computed corresponding point, which may possibly exist in any positions other than that of the true corresponding point, and change its position arbitrarily. The positional change may be resorted in, a process for improving the accuracy of the corresponding point, as described later. In this specification, the term "corresponding point" is used to include both true and computed corresponding points without a distinction between the two concepts, unless it is necessary to differentiate them.

According to a further aspect of the present invention, a depth of a 2-D image is obtained, in which when the depth of any point in a certain image is calculated as negative, the depth is recalculated while referring to the depth information of points close-by with a positive depth value. That is, when a depth is calculated as negative, that is probably because of unsuitable variables being used during the calculation. Therefore, such a negative depth should be corrected based on the depth of a close point.

The third object of the present invention relates to the above [3], that is, utilization of depth information in image processing other than the creation of a pseudo stereoscopic image.

In order to achieve this object, according to the present invention, in creating a stereo image by giving a parallax to a 2-D image according to its depth information, the parallax is first changed so as to fall within a predetermined range, so that the stereo image will be created according to the changed depth information. An excessively large parallax would cause fatigue on a viewer's eyes. On the contrary, an excessively small parallax would invalidate the meaning of a parallax as data. Therefore, it is necessary to keep a parallax within a desired range.

According to another aspect of the invention, in creating a stereo image by giving a parallax to a 2-D image according to its depth information, the parallax originally determined according to the depth information is set to be variable. With this arrangement, upon an instruction by a viewer to change a parallax, for example, it is possible to create and display a pseudo stereoscopic image which is agreeable to the preference of the viewer.

According to a further aspect of the invention, in creating a stereo image by giving a parallax to a 2-D image according to its depth information and displaying the stereo image on a stereo image display apparatus, a process to be conducted to the 2-D image so as to cause the parallax is determined according to a display condition unique to the stereo image display apparatus. The display condition is governed by the size of a display screen of the display apparatus, and an assumed distance from the display screen to a viewer.

According to a further aspect of the invention, in creating a stereo image by giving a parallax for every image part of a 2-D image according to its depth information, an uneven image frame outline caused by the given parallax is corrected. More particularly, in giving a parallax, if an image area shown at the right end of the screen, for example, is displaced slightly rightward, the image area resultantly projects off the original shape of the image frame, and thus causes uneven parts along the edge of the image frame. A correction made to such an uneven part would straighten the appearance of the frame. The correction may be made by uniformly cutting off a peripheral part of the frame at a certain width, so as to achieve a desired shape of the image frame.

According to a further aspect of the invention, in a method where image processing is carried out for a 2-D image according to its depth information, an image area subject to the image processing is determined, based on the depth information. With this arrangement, it is possible to separate an object or to change the scale of an object a certain distance from a viewer.

According to the further aspect of the invention, in a method where image processing is carried out on a 2-D image according to its depth information, images with viewpoints at a plurality of points on a hypothetical moving path, where a shooting point of the 2-D image is hypothetically moved, are created for use as a slow motion image, based on the depth information.

It is to be noted that, according to the present invention, a viewfinder image seen from a different point may be created according to depth information. A positional displacement of respective image parts, which will be caused accompanying a change in the view point, are calculated based on depth information, so that a viewfinder image is re-created so as to correspond to the positional displacements caused. When a viewpoint is changed in height, for example, a displacement (the extent of translation and rotation movements) of the object (respective image parts) can be-calculated based on the distance by which the camera has moved and the depth information, so that a desired viewfinder image will be created based on the calculation result.

BRIEF DESCRIPTION OF THE DRAWINGS

FIG. 14 shows representative points each given an actual numeric value.

DESCRIPTION OF THE PREFERRED EMBODIMENTS

Preferred embodiments of the present embodiment will next be described with reference to the accompanying drawings. In Embodiments 1 to 4, an apparatus outputs as a final image an image for a 3-D display (a pseudo stereoscopic image), while in Embodiments 5 to 7, it outputs an image for a 2-D display (an ordinary 2-D image).

In Embodiments 1 and 2, the apparatus initially receives a viewfinder image shot on a monocular camera, while in Embodiment 3 it receives a viewfinder image shot on a multi-eye camera (a stereo image). Embodiments 1, 2, and 3 correspond to Embodiments 5, 6 and 7, respectively, except that the former outputs an image for a 3-D display and the latter for a 2-D display. Embodiment 8 relates to a displaying method, in which unique conditions for a display apparatus are considered when displaying a pseudo stereoscopic image.

Embodiment 1.

Figure 1:
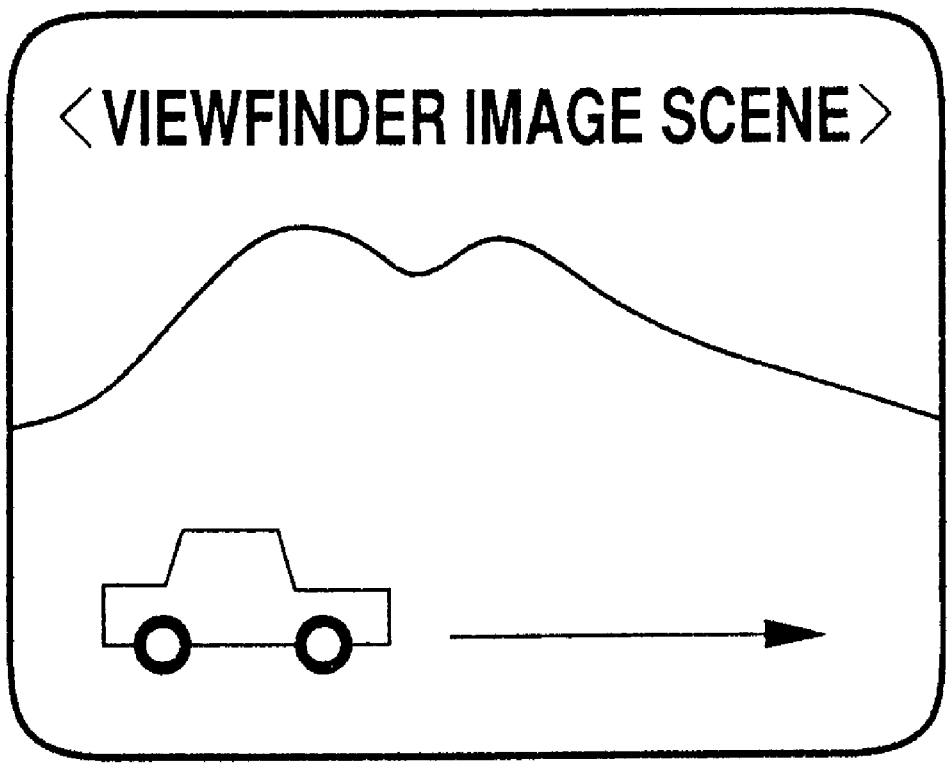
FIG. 1 is a viewfinder image where an object moves from left to right while a background stays still.
Figure 2:
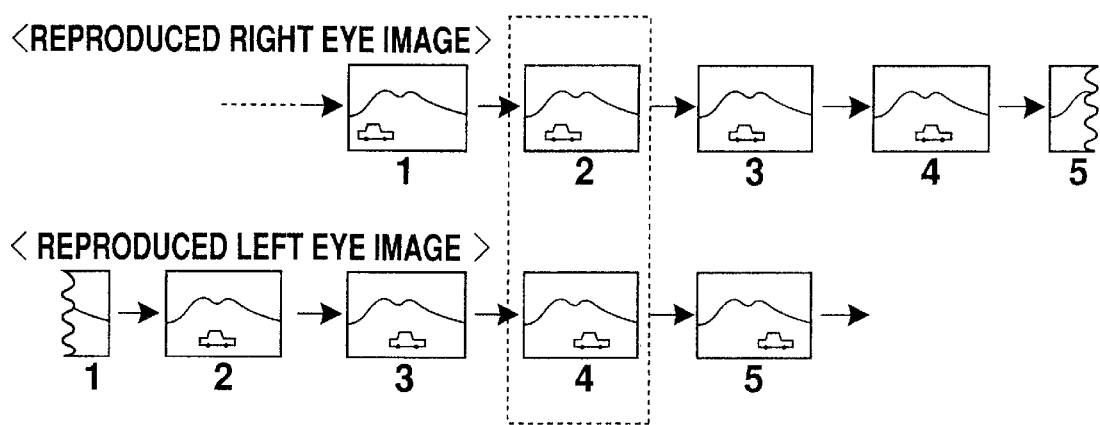
FIG. 2 shows reproductions of right and left images having a time lag between them.
Figure 3:
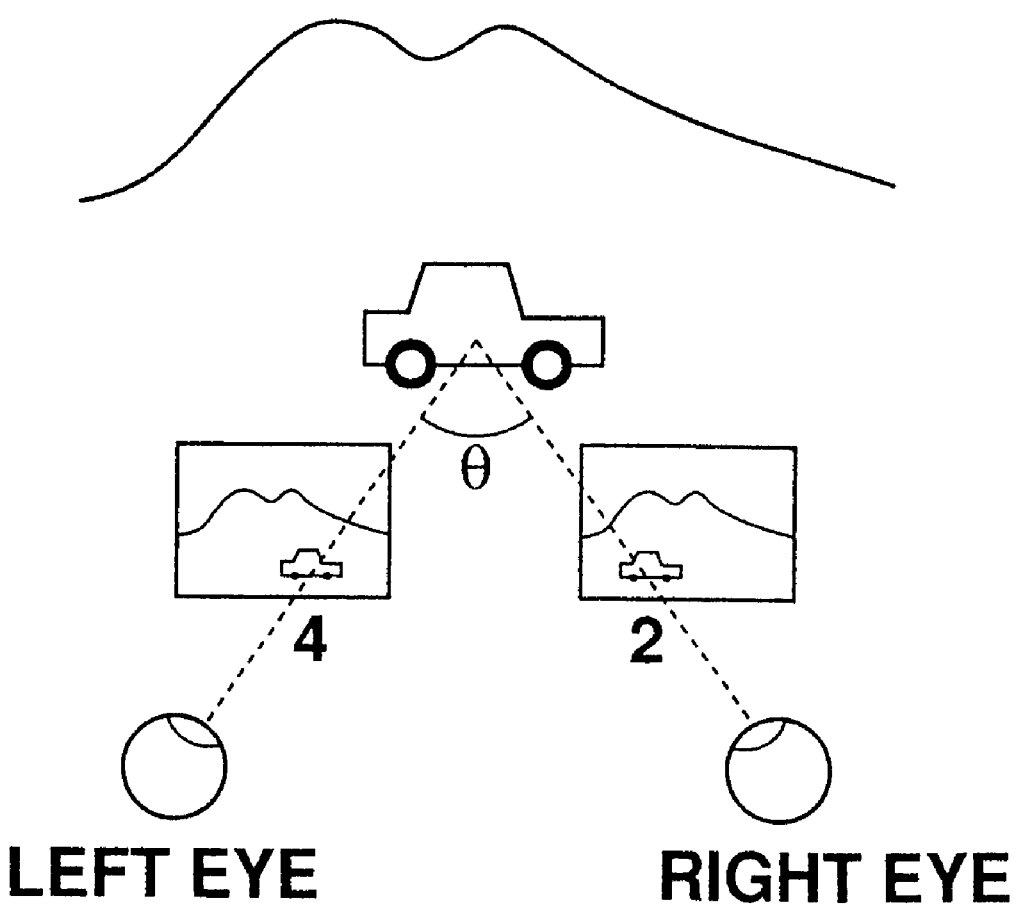
FIG. 3 shows a parallax caused due to the lapse of time of FIG. 2.
Figure 4:
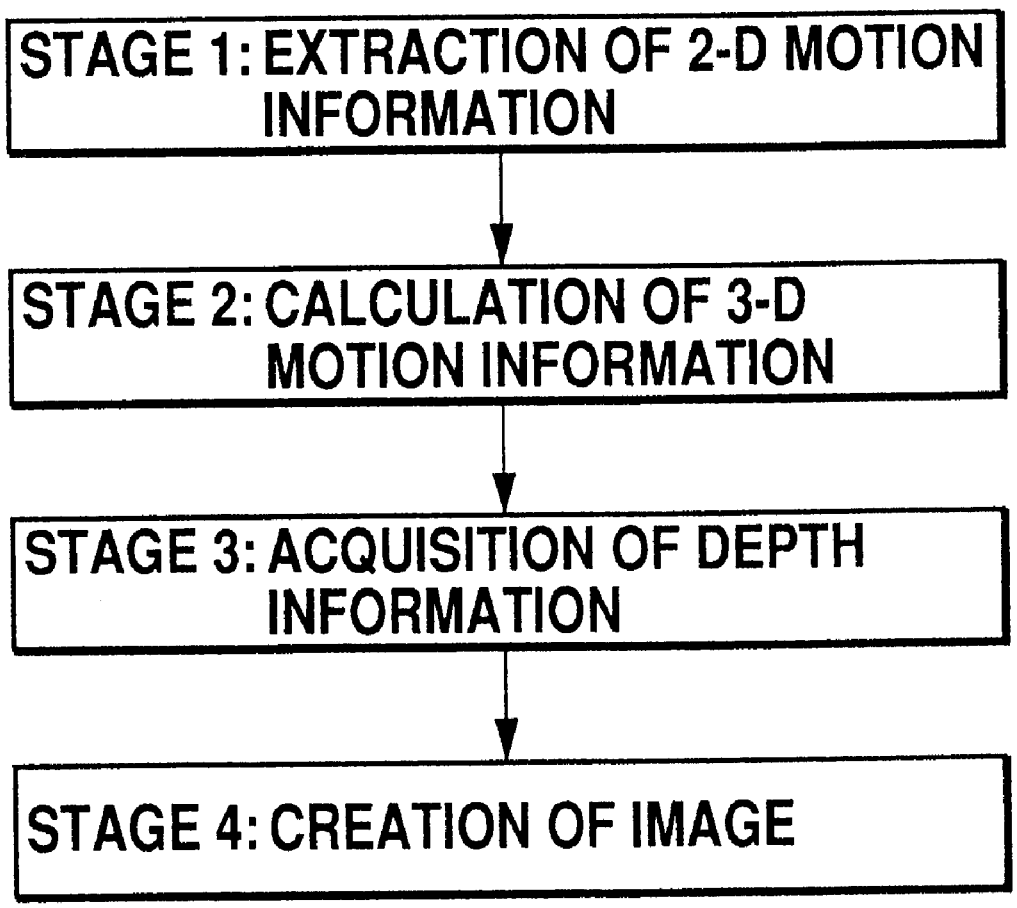
FIG. 4 shows main stages for the creation of an image for a 3-D display according to Embodiment 1.

FIG. 4 shows main stages for the creation of an image for a 3-D display according to Embodiment 1. Up to the third stage, the content of the method for calculating depth information according to the present invention will become apparent.

In Embodiment 1, an image for a 3-D display is created bases on an image for a 2-D display through Stages 1 to 3 for analyzing an image for a 2-D display, and Stage 4 for creating an image for a 3-D display. Respective stages will next be outlined.

[Stage 1] Extraction of 2-D Motion Information

Information about the movement of an object shown in a viewfinder image is first extracted. The motion information is 2-D at this stage. That is, coordinates are overlaid onto a display screen, so that the movement of the object on the screen will be expressed by means of 2-D coordinates.

In order to understand the movement of the object, a corresponding relationship between viewfinder images is detected.

A viewfinder image at Time t is designated as a reference frame (hereinafter referred to as "Frame t"), while a viewfinder image at Time t' is designated as an object frame (hereinafter referred to as "Frame t'"). In Frame t, a plurality of representative points are pre-provided, so that corresponding points of the representative points are traced in Frame t'. Frames t and t' constitute different-time frames with each other, though they are not necessarily to be adjacent in terms of frame sequence. Stage 1 is characterized by the fact that 2-D information can be extracted from not only a horizontal movement of an object but also from movements in any direction. Hereinafter in this specification, (t) and (t') are defined as time, and a frame is defined as a unit constituting a viewfinder image in general, but is not limited to a particular frame of a television picture receiver, which comprises 525 scanning lines, or a screen of a personal computer, which comprises 640×480 pixels or the like.

Alternatively, representative points may be provided in not only Frame t but also both Frames t and t'.

[Stage 2] Calculation of 3-D Motion Information

After identifying the 2-D movement of the object, information about an actual 3-D movement of the object is calculated as 3-D motion information. The 3-D motion is expressed by six parameters: three for translation and three for rotation. This calculation is made based on a plurality of pairs of representative and corresponding points.

[Stage 3] Acquisition of Depth Information

Identification of the actual movement of the object would define a relative positional relationship between the objects at different times. Further, identification of this relationship could provide depth information of the object or its respective parts (hereinafter referred to respective image parts).

[Stage 4] Creation of Image

A parallax is determined based on the depth information, so as to create right and left images. The parallax is determined such that a closer object has a larger parallax. Since, respective image parts should have a different depth, right and left images should be created such that the respective image parts of each image have a different parallax. It is to be clearly understood that the following facts are different from each other and should not be confused; that is, the fact that the motion information can be extracted from a movement in any direction at Stage 1, and the fact that the direction in which a parallax is provided is limited to a horizontal direction at Stage 4 due to the horizontal locations of both eyes viewing the object.

Respective stages in Embodiment 1 have been outlined above. In the following, they will be further described in detail.

[Stage 1] Extraction of 2-D Motion Information

Figure 5:
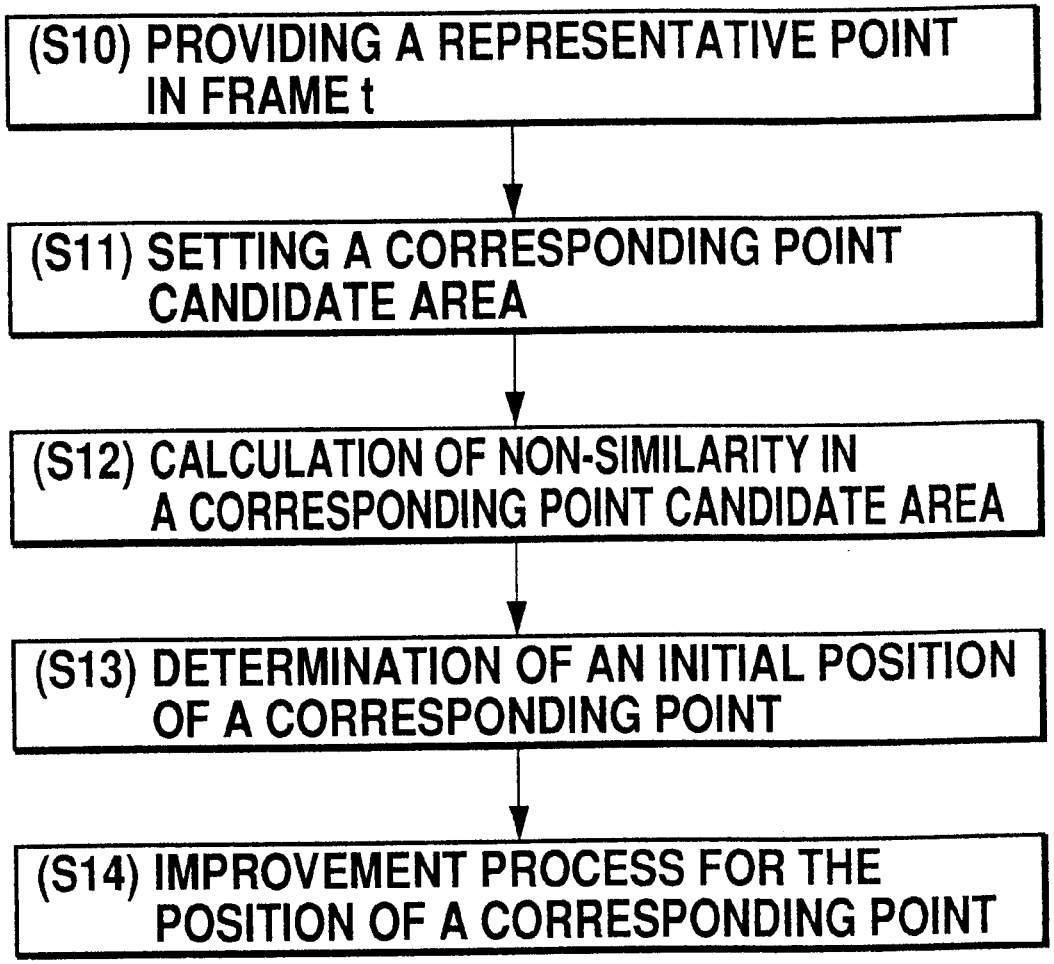
FIG. 5 is a flowchart for the detection of a corresponding relationship between viewfinder frames.

FIG. 5 is a flowchart for detection of a corresponding relationship between viewfinder image frames, respective steps of which will next be described one by one.

(Step 10) Providing a Representative Point in Frame t

Figure 6:
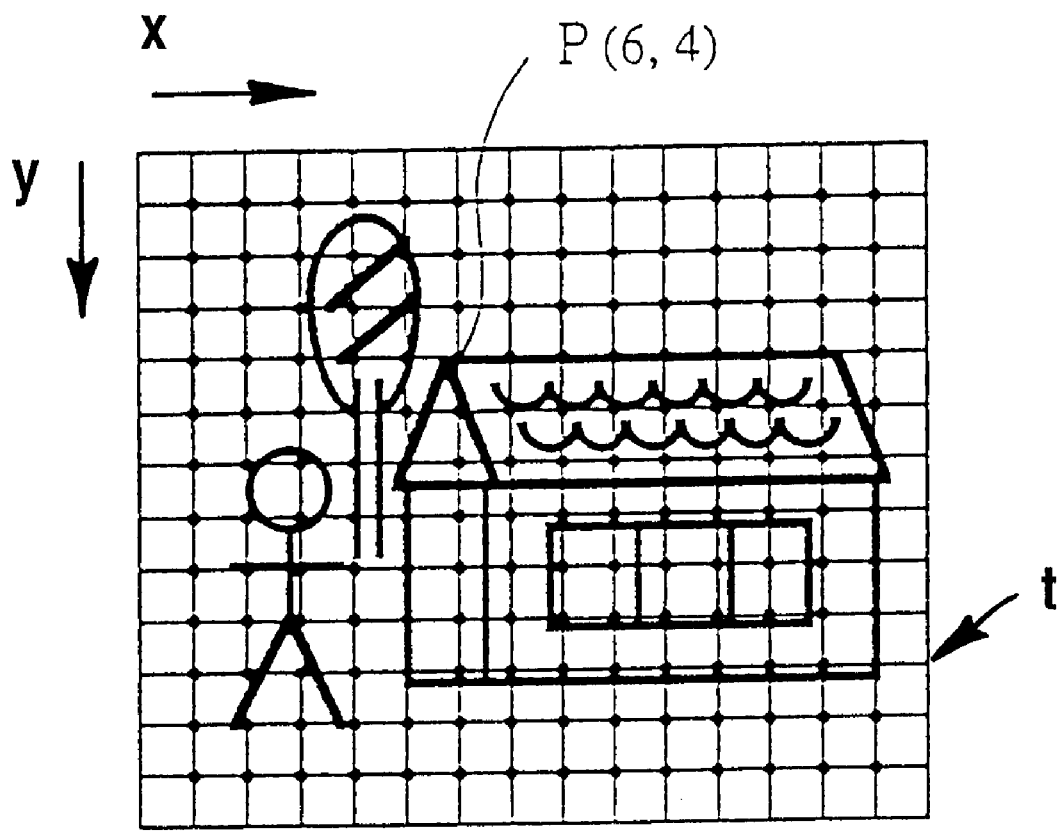
FIG. 6 shows representative points provided in a reference frame t.

As shown in FIG. 6, representative points are provided in a Reference Frame t. In FIG. 6, Frame t is divided into every 8×8 pixels by overlaying it with a grid, and representative points are provided at every crossing point of the horizontal and perpendicular lines of the grid. The representative point of the i-th from left and the j-th from the top is expressed as Pt(i,j); a corresponding point of Pt(i,j) at time t' is expressed as Pt'(i,j). The x and y coordinates of Pt(i,j) are expressed, if required, as Pt(i,j)x and Pt(i,j)y, respectively.

A representative point may be provided not only at a crossing point but at also any desired points. As an extreme case, all pixels may be individually designated as independent representative points.

(Step 11) Setting a Corresponding Point Candidate Area

Taking an example of Pt(6,4) in FIG. 6., an area which may possibly include Pt'(6,4) is pre-determined based on the assumption that Pt'(6, 4) be positioned in the vicinity of Pt(6, 4) except for a drastic movement of a viewfinder image so as to exceed a predetermined limitation. In Embodiment 1, in order to reduce calculation for a positional detection, Pt'(6,4) is assumed as existing in an area of 100×60 pixels in the vicinity of Pt(6,4).

Step 11 can also be modified as follows:

1. When a viewfinder image moves relatively drastically, two frames adjacent in terms of frame sequence are determined as Frames t and t' so as to minimize the extent of a change in the position of representative point between Frames t and t', and thus the risk of displacing the corresponding point from the assumed area. Of course, it is possible to assume the whole image area as a corresponding point candidate area. The risk of displacing a corresponding point from the assumed area due to a large movement of the viewfinder image is thus reduced, although the volume of calculation is resultantly increased.

2. In the above, a corresponding point candidate area has been determined based on a simple assumption that Pt'(6,4) be located in the vicinity of Pt(6,4). However, when the movement of Pt(6,4) is traced among a plurality of frames, a corresponding point candidate area can be determined on the extension of the movement trail. This method is particularly advantageous in limiting such an area in the case of a viewfinder image with a relatively constant movement.

(S 12) Calculation of Non-Similarity in a Corresponding Point Candidate Area

The position of a corresponding point is specified in the corresponding point candidate area. In this case, a problem arises when the viewfinder image moves considerably slowly, contrary to Step 11. That is, when the viewfinder image moves only by a small extent, it is difficult to extract motion information and thus the risk of a severer error being included in information is increased.

In order to prevent such a problem, Time t' is pre-selected such that Frames t and t' are set apart from each other by some extent. In other words, after conducting statistical analysis to the extent of changes of respective image parts, Time t' is selected such that the magnitude of changes or the variance of the extent of changes, exceeds a predetermined value. Alternatively, Time t' may be selected such that the total sum of or the variance of, the movements of more than a predetermined number of characteristic points (described later) exceeds a predetermined value. If such Time t' that meets the above conditions is not found, the creation of an image for a 3-D display (or the calculation of depth information) is discontinued and, instead, an input viewfinder image will be output intact or all image parts of the viewfinder image are displayed as if having a uniform depth.

In this step, in order to determine the position of a corresponding point, non-similarity between Frames t and t' is computed by block matching method. That is, the total sum of squared differences of gray-scale levels (non-similarity) is computed between one block having a certain point as its center in the corresponding point candidate area, and another block including the representing point, so as to detect a certain point providing the minimum sum, which is then determined as a computed corresponding point.

Figure 7:
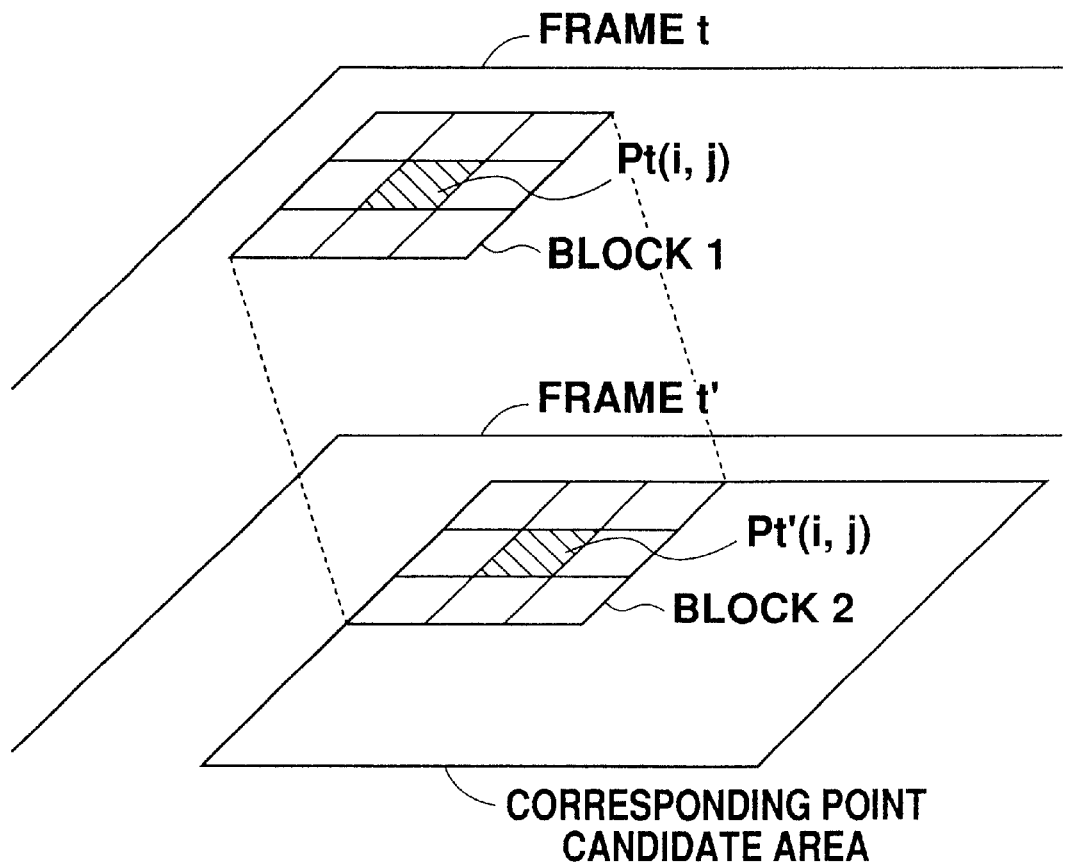
FIG. 7 shows block matching.

FIG. 7 shows block matching. In Embodiment 1, nine pixels; constitute one block with the central pixel as a representative point of the block.

Block 1 is provided on Frame t, including Pt(i,j), while Block 2 is provided on Frame t', including Pt'(i,j), that is a tentative candidate for a corresponding point. With a pixel value of a pixel(x,y) at Time t designated as It(x,y), the non-similarity (hereinafter referred to as E1) is generally obtained from following Equation 1.

$$E1 = \Sigma\Sigma \{It(Pt(i,j)x+u, Pt(i,j)y+v) - It'(Pt'(i,j)x+u, Pt'(i,j)y+v)\}^2 \quad [\text{Equation 1}]$$

wherein two $\Sigma$'s relate to u and v. Since u and v respectively take the values of $$u = -1, 0, 1$$
$$v = -1, 0, 1$$

for a tentative Pt'(i,j), a squared difference of gray-scale level can be obtained with respect to the nine pixels in total. Then, while gradually changing the position of Pt'(i,j) within the candidate area, a point with the minimum E1 value is determined as a corresponding point.

Figure 8:
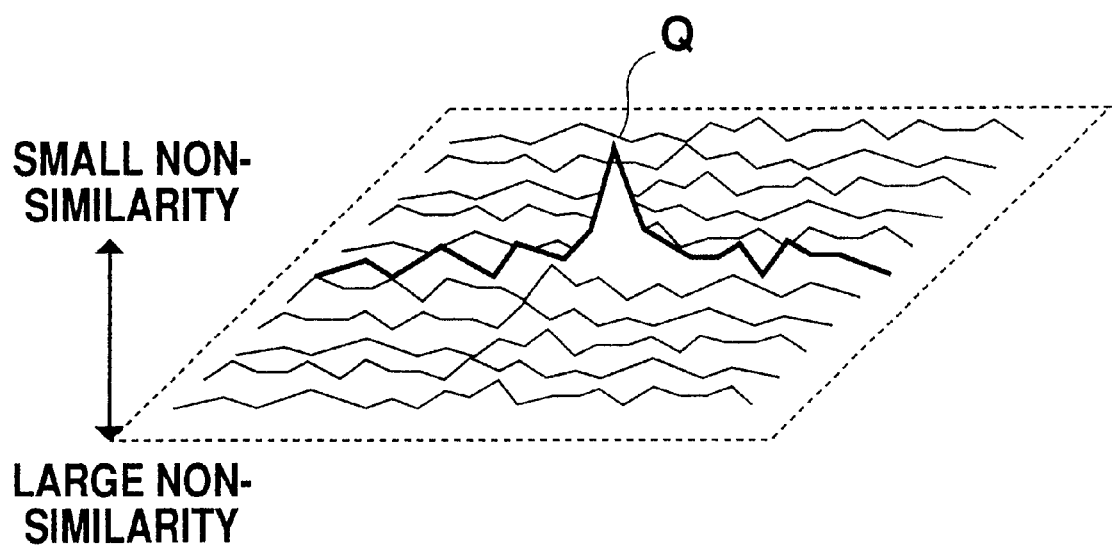
FIG. 8 is a conceptual model where the value of El is indicated for a tentative corresponding point Pt'(i,j) in a perpendicular direction.

FIG. 8 is a conceptual model having the value of E1 in a perpendicular direction for every Pt'(i,j). In this model, Point Q is determined as a corresponding point, since it shows a steep peak in non-similarity. In this way, corresponding points of all representative points are determined.

Step 12 can also be modified as follows.

1. In the above, a squared difference of gray-scale level has been calculated, as a non-similarity, from a gray-scale image. Though, in a color image, the non-similarity may be the total sum of squared difference of gray-scale levels in red, green and blue, that is $E1_R + E1_B + E1_G$. Alternatively, the density of other color spaces, such as an HVC density, may be employed, or the total sum of residual differences may be employed in place of a squared difference of gray-scale level.

2. In this step, nine pixels constitute one block, though it is preferable that one block is defined including a relatively large number of pixels. For example, with a screen having a high resolution, such as that of in a personal computer, a work station or the like, experiments have shown that a good result was obtained in case of a block including around 16×16 pixels.

(S13) Determination of an Initial Position of a Corresponding Point

Figure 9:
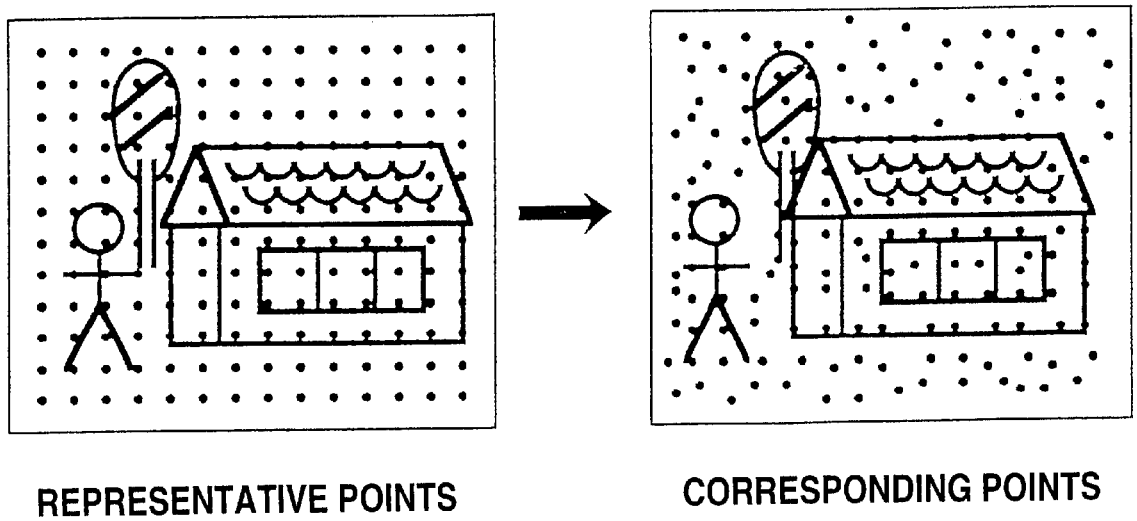
FIG. 9 shows a relationship between a representative point and its corresponding point determined at S12.

Up to Step 12, a tentative corresponding point has been determined, though it may not be positioned correctly. Corresponding points relating to borders or edges of an object may have been determined with satisfactory accuracy, though it should be understood that points relating to less characteristic image parts may have been determined with considerable errors. Such a problem is likely to arise in a case where the value of E1 does not show a definite peak in FIG. 8, or the like. FIG. 9 shows a relationship between a representative point and its corresponding point, the corresponding point being determined up to Step 12. Apparently, although corresponding points relating to characteristic parts, such as a house and a tree, and especially their outlines, are positioned with satisfactory accuracy, points relating to the sky or the ground are positioned with considerable errors.

In Step 13 and subsequent Step 14, therefore, such inaccurately positioned corresponding points are adjusted so as to be at a correct position. In Step 13, the concept of an initial position is introduced, so that the initial position of each of the corresponding points is actually determined in this step. In subsequent Step 14, the positional accuracy is improved through repeated calculations.

The initial position is determined, following either way stated below.

1. All corresponding points which have been determined up to Step 12 are equally processed in Step 13.

Positions where all corresponding points are now located are regarded as their initial position for the subsequent processing.

2. Corresponding Points are Processed Differently.

As for corresponding points whose positions may have been determined with satisfactory accuracy (hereinafter referred to as a characteristic point), positions where they are now located are regarded as their initial positions. On the other hand, as for other corresponding points (hereinafter referred to as a non-characteristic point), their initial positions will be determined based on those of the characteristic points. The corresponding points mentioned below can be candidates for a characteristic point, though corresponding points of the following (1) to (3) are likely to coincide. In this specification, representative points of the corresponding points as a characteristic point are also referred to as a characteristic point.

(1) A corresponding point having a definite peak in the value of E1 in Step 12.

Generally, such corresponding points are quite likely to have been positioned with a high positional accuracy.

(2) A corresponding point located in an area including many orthogonal edge components.

Corresponding points included in areas around edges of buildings are quite likely to have been correctly positioned.

(3) A corresponding point whose position varies steadily from Frame t to t' and further.

The steadiness may be understood as the consistency of a motion vector. Therefore, a corresponding point moving in a consistent moving direction by a consistent distance as a frame proceeds frames t to t', should further be selected as a characteristic point. Concretely speaking, a corresponding point to be selected should have a motion vector whose variance is lower than a predetermined value, because such a corresponding point must have been traced precisely among respective frames, and thus having been judged as having a correct corresponding relationship with its representative point. However, when the camera has moved irregularly, the influence thereof must be considered in the judgement.

When a characteristic point is determined, its position is used as an initial position, while the initial position of a non-characteristic point will be interpolated by using neighboring characteristic points. In other words, since the positional accuracy of a non-characteristic point determined up to Step 12 is low, their initial positions should be determined geometrically based on the neighboring characteristic points with high positional accuracy. Of course, the method of Step 12 can be utilized in finding a characteristic point described in the above (3).

In addition to the above-mentioned methods based on the selection of a characteristic point, the initial position of a corresponding position may be determined by a dynamic programming method.

(S14) Improvement Process for the Position of a Corresponding Point

Figure 10:
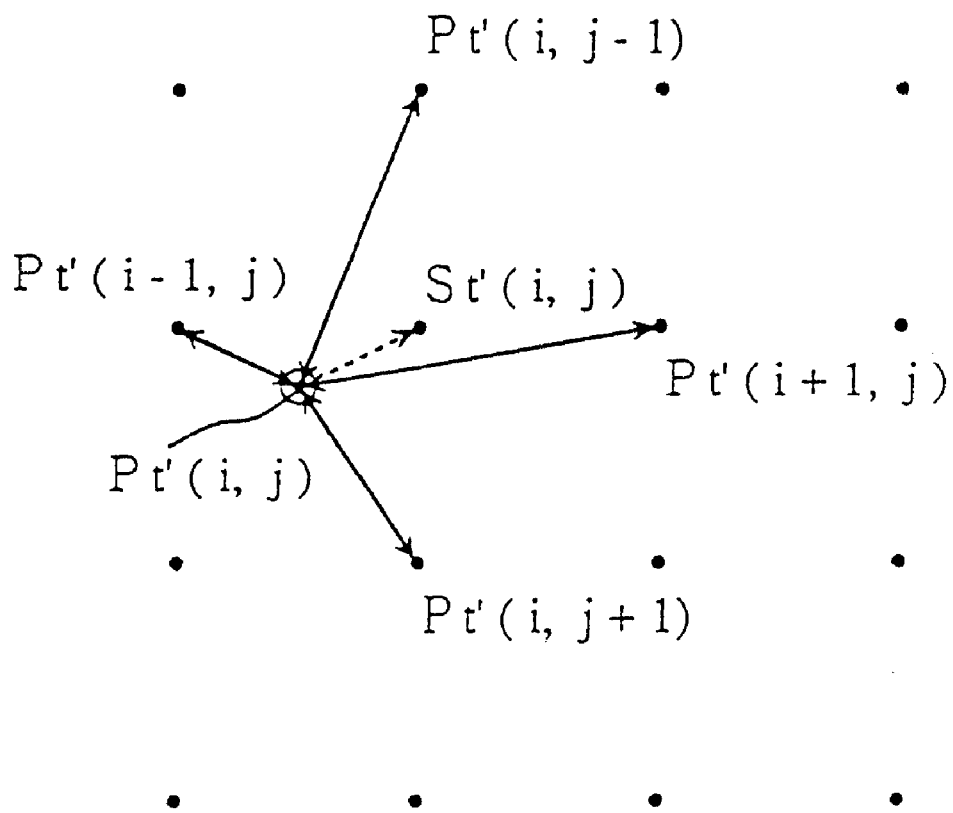
FIG. 10 is an explanatory diagram regarding a principle of evaluation of a relative position of corresponding points.

An equation is introduced for evaluating positional acceptability of corresponding points, so as to improve the relative positional acceptability through iterative calculations with the equation. That is, in addition to Equation 1 in Step 12, another equation is introduced for evaluating acceptability of a relative positional relationship between corresponding points. The evaluation results derived from both of the equations are combined to improve the positional accuracy. Referring to FIG. 10, the principle of relative positional evaluation will be described. FIG. 10 shows corresponding points. Taking Pt'(i,j) as a center, the following four corresponding points are located adjacent thereto:

$$Pt'(i-1, J), Pt'(i+1, j), Pt'(i, j-1), Pt'(i, j+1)$$

It is reasonably assumed that Pt'(i,j) is located around the center of gravity of these four points. This assumption is based on the experience that, even when respective image parts move, their relative positional relationship is substantially maintained. This experience can be mathematically explained as being equal to a situation where a quadratic differential of Pt'(i,j), which is a function of i and j, is substantially zero.

Therefore, with the center of gravity of the four points being expressed as (St'(i,j)x, St'(i,j)y), Equation 2

$$E2=\{Pt'(i,j)x-St'(i,j)x\}^2+\{Pt'(i,j)y-St'(i,j)y\}^2 \quad \text{[Equation 2]}$$

is obtained for evaluating relative positional acceptability. With consideration of Equation 2 only, a corresponding point will be most favorably positioned with the minimum E2 value. In other words, relative positional acceptability of images is evaluated using the function of distance between neighboring image parts.

In this step, evaluation results derived from Equations 1 and 2 are combined with an appropriate coupling factor k. Therefore, a final evaluation equation E can be expressed as Equation 3

$$E=E1/N+kE2 \quad \text{[Equation 3]}$$

wherein N is the number of pixels included in one block, which has been determined for block matching. In other words, for the improvement of the relative positional acceptability, E is first; computed with respect to all of the corresponding points. Then, after adding all E's into $\Sigma E$, the respective corresponding positions are moved gradually so as to minimize the value of $\Sigma E$ This computation is repeated until either the value of $\Sigma E$ converges or the computation is repeated up to a predetermined number of iterations. That is, concretely speaking, any of the following methods is practiced while moving respective corresponding points.

(1) A Method Using an Euler-Lagrange Differential Equation

When an Euler-Lagrange differential equation expresses $\Sigma E$ taking an extremum (a relative minimum in this case), a corresponding point is obtained by solving this Euler-Lagrange differential equation. This is a known method. According to this method, a direction in which a corresponding point is to be moved for improvement from its initial position is determined based on both gradient in respective blocks including a representative point and differential between corresponding blocks, so that the corresponding point is gradually moved in the direction from its initial point until reaching a final solution.

(2) Fixed Searching Method

In a corresponding point candidate area, a point is searched where the value of E of a corresponding point to be improved. becomes minimized, and then newly set as a corresponding point. The fixed searching method is characteristic in that the search is conducted for one corresponding point, while others are kept fixed. The above mentioned process is repeated with respect to all corresponding points.

(3) Hybrid Method

According to the method (1), it is possible to position a corresponding point with an accuracy theoretically in units of less than a pixel, while according to the method (2), with an accuracy in units of a pixel. Therefore, it is possible to utilize both methods, that is, first applying the method (2) to obtain a corresponding relationship with an accuracy in units of a pixel, and then the method (1) to enhance the accuracy.

Experiments have shown that the method (2) provides a favorable solution in a shorter period of time than the method (1) used to obtain the same level of accuracy.

Figure 11:
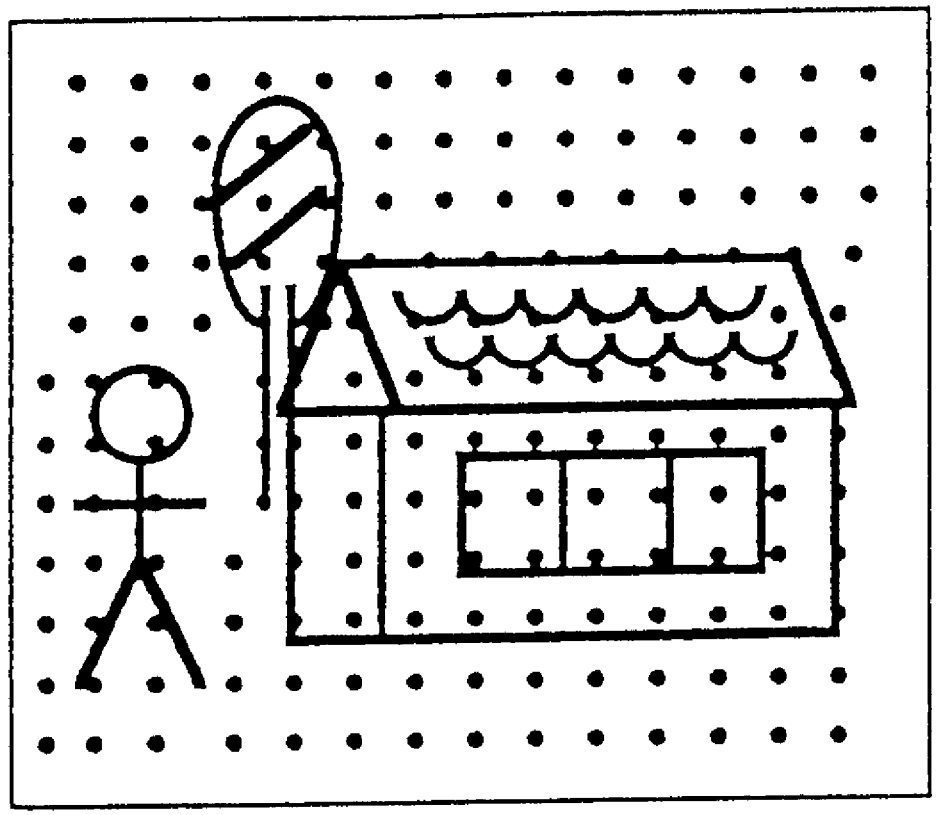
FIG. 11 shows a result of improvement processing conducted on candidates for corresponding points in FIG. 9.

FIG. 11 shows the result of improvement processing according to this step, which has been conducted with respect to candidates for corresponding points shown in FIG. 9. Experiments have shown that a favorable result was obtained in a color image, with the coupling factor k at around 5 to 200. FIGS. 9 and 11 show model results, though actual experiments have proved that improvement close to the model results was realized.

This step is characteristic in that 2-D motion information can be extracted from the movement of an object in any direction. This is an advantage achieved through understanding of the movement of an object by introducing the concept of representative and corresponding points. This advantage makes the present invention applicable over a wider range, compared to a prior art, in which a time difference has been determined through the detection of a horizontal movement.

Step 14 can be also modified as follows:

1. In obtaining E2, a center of gravity of eight points may be determined, the eight points including four points diagonally located from the center, that is Pt'(i,j) in FIG. 10, as well as the four respectively located upward of, downward of, to the left of and to the right of the center. Preferably, the optimum combination of the points is determined experimentally, as it depends on the kind of 2-D image to be processed.

2. Evaluation by Equation 3 should begin with a corresponding point whose evaluation result of Equation E2 is not favorable, because a drastic improvement to such a corresponding point at an early stage is preferable, as it is generally considered to have a large error.
3. For the improvement of the positional accuracy, geometrical information should be utilized. As for a plurality of representative points forming an area with a geometrical feature, such as a straight line, in Frame t, positions of their corresponding points should be corrected so as to also form the same geometrical feature. This correction is made for reasons that a part which seems to be a line in a viewfinder image is quite likely to form a line in the actual 3-D world as well, and a line in the 3-D world should form a line in Frame t' as well. Since the depth of an image varies consistently along a line, and because such a linear variation can be visually recognized with ease, the correction by the above mentioned method will achieve a significant improvement. Without such an improvement, the final image may include irregularity in depth along a line, thus possibly resulting in an unnatural 3-D display. As alternative geometrical information, edges of an image area can be used.
4. Further, corresponding points are obtained with respect to other frames as well. In this stage, corresponding points are only obtained in Frame t' with respect to Frame t, though it is possible to obtain corresponding points in a third frame, or Frame t", so as to obtain averaged movements of respective image parts. This method is not for improving a relative positional accuracy of the corresponding points in Frame t', but rather for statistically determining the movements of respective image parts, based on the respective positions of corresponding points, which have been provided in many frames, and the respective times when the respective frames are shot.
5. When an insufficient number of characteristic points are established, the ongoing process is discontinued because it is quite unlikely that an accurate corresponding relationship will be obtained.

[Stage 2] Calculation of 3-D Motion Information

In Stage 1, the 2-D movements of respective image parts on a screen have been identified. In Stage 2, 3-D movements thereof are calculated based on the identified 2-D information. That is, since the 2-D movement in a viewfinder image is a projection of the actual 3-D movement of an object onto a plane, the original 3-D movement of the object is calculated based on the positional relationship between representative and corresponding points in a viewfinder image.

Movements of an object in the 3-D world can be generally described as a combination of translation and rotation movements. In the following, a method for calculating a movement comprising translation movements only will be described first, followed by an example of a generalized method.

1. Translation Movements Only

Figure 12:
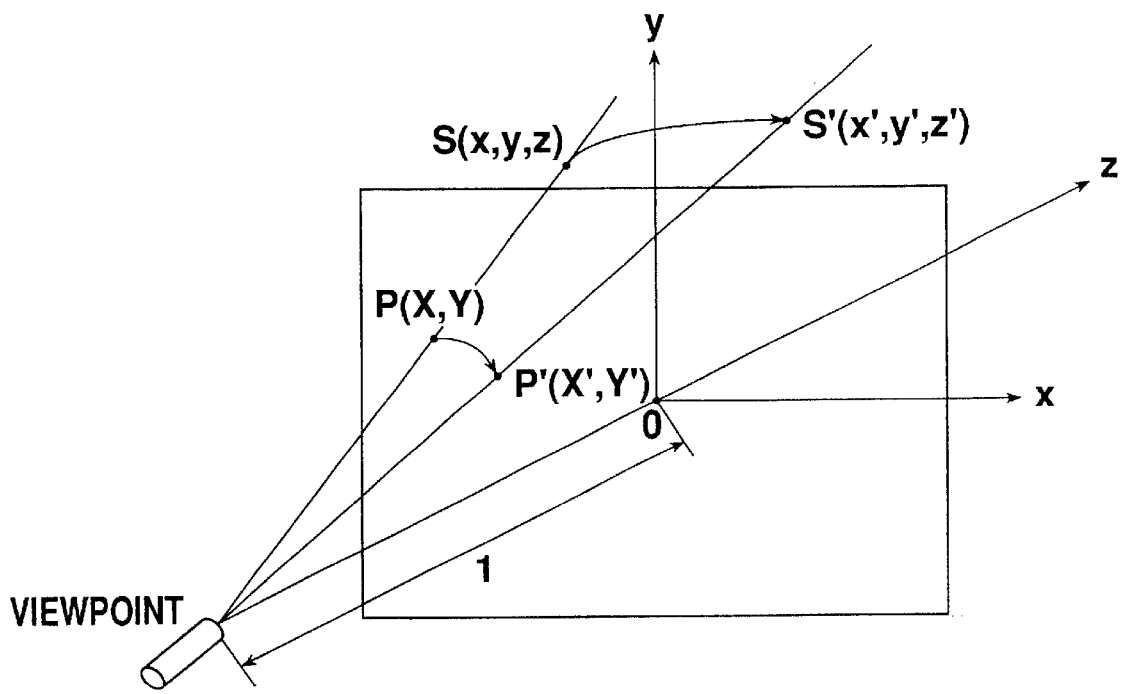
FIG. 12 shows a relationship between movements of Point P on a screen and a 3-D space.

FIG. 12 shows a corresponding relationship between the movement of Point P on a screen and its actual movement in a 3-D space. In FIG. 12, the 2-D coordinates are expressed with a capital letter, while the 3-D coordinates are expressed with a small letter, in which x and y axes are provided on the surface of the screen, while the z axis is in the depth direction. The distance from the viewpoint and the screen is set as 1.

As shown in FIG. 12, P(X,Y) moves to P'(X',Y') in the 2-D screen, while S(x,y,z) simultaneously moves to S(x', y', z') in the 3-D space.

When the following equation is held $$(x',y',z')-(x,y,z)+(a,b,c)$$

since the screen is placed a distance of 1 from the viewer, X, Y, x' and y' can be expressed as follows:

$$X=x/z,$$

$$Y=y/Z$$

$$x'=x'/z',$$

$$Y'=y'/z'$$

By solving the above, the following is introduced.

$$X'=(Xz+a)/(z+c)$$

$$Y'=(Yz+b)/(z+c)$$

Therefore, with z eliminated, Equation 4 is obtained.

$$(a-X'c)(Y'-Y)=(b-Y'c)(X'-X) \qquad \text{[Equation 4]}$$

Since Equation 4 is expressed in terms of movements on the screen, it is possible to obtain unknown values of (a), (b), and (c) according to the information obtained in Stage 1. However, although, in an actual situation where an object that is k times larger moves at a speed k times higher to a place away k times further, the value of k (a scale factor) cannot be determined, the ratio of values of (a), (b) and (c) to one another can be solely obtained. Mathematically speaking, even if three pairs of (X,Y) and (x',y') are given, since the rank of a coefficient matrix of this simultaneous equation is as low as two, (a), (b), and (c) cannot be determined as real values but only as relative values. Therefore, in this stage, the value of (c) is normalized to one, so as to express the values of (a) and (b) as a ratio against (c) because a ratio is sufficiently usable in the subsequent processing.

An alternative solution with respect to translation movements is as follows. An error (e) is defined from Equation 4, as Equation 5.

$$e=\{(a-X'c)(Y'-Y)-(b-Y'c)(X'-X)\}^2\ e=\{(Y'-Y)a-(X'-X)b-(XY'-X'Y)c\}^2 \qquad \text{[Equation 5]}$$

Then, the total sum $\Sigma e$ of all (e)'s regarding all corresponding relationships between representative and corresponding points is calculated, so that the respective values of (a), (b) and (c) are obtained from Equations 6 to 8 so as to minimize the value of $\Sigma e$.

$$d(\Sigma e)/da=0 \qquad \text{[Equation 6]}$$

$$d(\Sigma e)/db=0 \qquad \text{[Equation 7]}$$

$$d(\Sigma e)/dc=0 \qquad \text{[Equation 8]}$$

More concretely speaking, Equations 6 to 8 are respectively developed into Equations 9 to 11.

$$a\Sigma(Y'-Y)^2-b\Sigma(X'-X)(Y'-Y)-c\Sigma(Y'-Y)(XY'-X'Y)=0 \qquad \text{[Equation 9]}$$

$$-a\Sigma(X'-X)(Y'-Y)+b\Sigma(X'-X)^2+c\Sigma(X'-X)(XY'-X'Y)=0 \qquad \text{[Equation 10]}$$

$$-a\Sigma(Y'-Y)(XY'-X'Y)+b\Sigma(X'-X)(XY'-X'Y)+c\Sigma(XY'-X'Y)^2=0 \qquad \text{[Equation 11]}$$

2. Movements Including Rotations

Movements including both translation and rotation can be expressed by means of three displacements in x, y and z axial directions and three rotation angles, such as α, β, and γ, each having a respective one of the x, y and z axes as an axis of rotation. Rotation angles can be expressed by means of an Eulerian angle or a roll pitch method.

The values of the above six variables are the next to be obtained. However, as explained above, since a scale factor cannot be determined, the ratio of the variables to one another is solely obtained, assuming one of the variables as one. It is theoretically possible to specify a movement when given five pairs of representative and corresponding points.

However, it is to be noted that, depending on the selection of the pairs, the content of movements may not be specified by means of solution on a linear transformation in some cases. However, it is known that the selection of eight pairs could prevent such cases, grounds of which can be found in references, such as "On the Linear Algorithm for Monocular Stereo-Scopy of Moving Objects" by Deguchi and Akiba, Transactions of Society of Instruments and Control Engineers vol.26, No.6, 714/720 (1990).

[Stage 3] Acquisition of Depth Information

Relative extent of the 3-D movements of the respective image parts have been identified in Stage 2. In Stage 3, depth information of the respective image parts is obtained based on the relative extent. In the following description, it is assumed that an object stays still, while the camera shooting the object moves instead. For this stage, since relative movements between an object and a camera is the target question, this assumption can be made.

The movement of a certain part in a viewfinder image is expressed by means of a rotation matrix R and a translation vector (a,b,c) as follows:

$$(x',y',z')=R(x,y,z)+(a,b,c)$$

The inverse transformation of this equation, which is expressed as the following Equation 12, is considered to be the movement of the camera.

$$(x,y,z)=R^{-1}\{(x',y',z')-(a,b,c)\} \quad \text{[Equation 12]}$$

Figure 13:
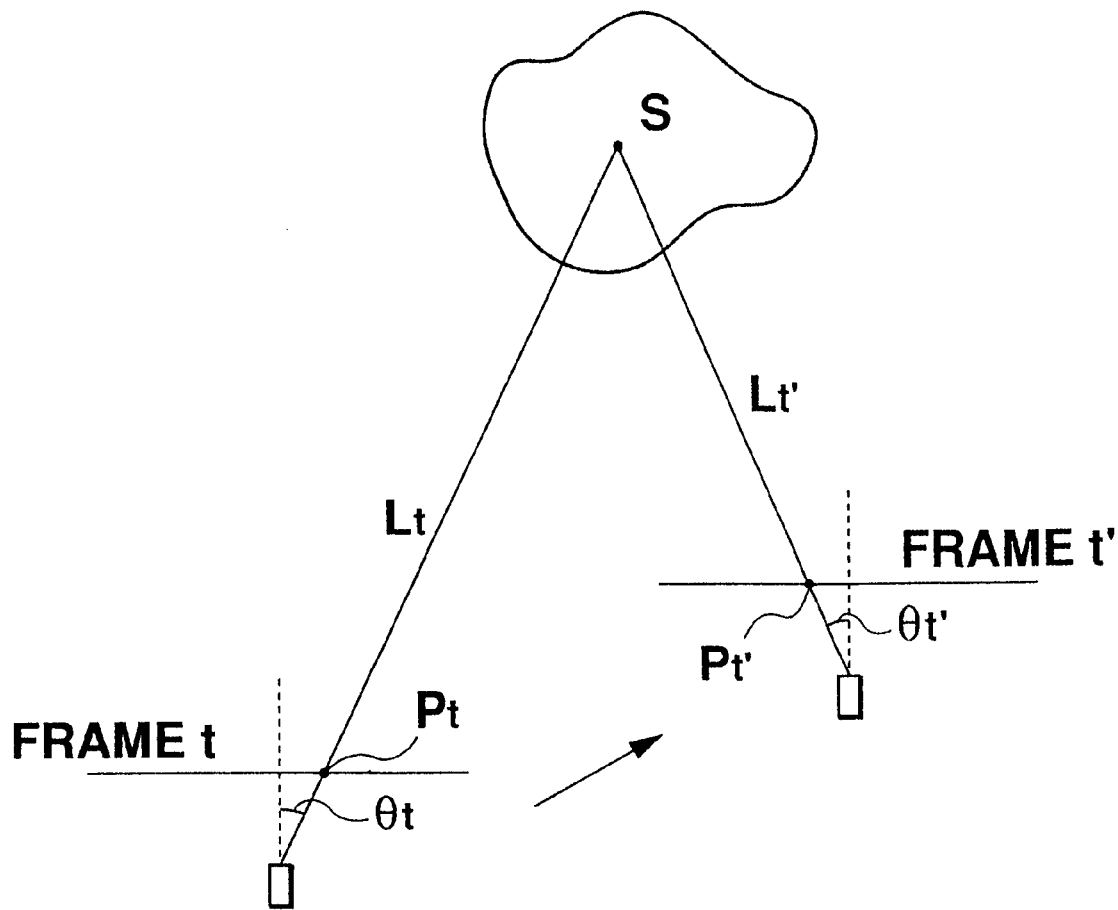
FIG. 13 is an explanatory diagram regarding a principle of determining 3-D coordinates of Point P, based on the 3-D movement of a camera and the movement of Point P on a screen.

Referring to FIG. 13, the principle for obtaining 3-D coordinates of Point P, based on 3-D movements of a camera and 2-D movements of Point P on a screen will be explained. This principal is generally known as one for triangulation, in which, when viewing the direction of Point P from two separate points, Point P (Point S in FIG. 13) actually exists at the crossing point of the lines of sight from the two points.

In FIG. 13, it is assumed that a camera is moved as indicated by the arrow from Time t to t' according to Equation 12. Point S is projected at Point Pt in Frame t and at Point Pt' in Frame t', Point S being a crossing point of lines Lt and Lt'.

Since angles θt and θt', which are formed by the direction in which the camera faces and Line Lt and Lt', respectively, are known and the direction in which the camera moves and its moving distance have been identified, it is possible to obtain 3-D Hcoordinates of Point S. Based on the 3-D coordinates of Point S, the respective image components-can be provided with their depth information.

It is to be noted that, -as describe d above, due to the normalization of (c) as 1, the obtained 3-D coordinates of Point S are having been expanded or compressed by a uniform ratio. However, since it is uniformly expanded or compressed as a whole, the depth information retains a correct relative positional relationship among respective image parts.

In the above mentioned processing at this stage, it is necessary to consider errors which have been caused up to the previous stage. In other words, due to such errors, Lines Lt and Lt' often do not cross each other as a result of calculation. To cope with such a problem, a point is provided at the middle of a line connecting points on Lines Lt and Lt' where the lines are closest to each other, so that a z coordinate of such a point will be approximately designated as a depth of Point S. This process will next be described using an expression.

When the direction vectors of Lines Lt and Lt' are respectively expressed as (u,v,w) and (u',v',w'), both Lines L and L' can be expressed as following Equation 13, using parameters of α and β (real number). words, by solving the equations of $$Lt:(x,y,z)+α(u,v,w)$$

$$Lt':(x',y',z')+β(u',v',w') \quad \text{[Equation 13]}$$

Therefore when an error (e) is expressed as the following $$e=\{(x+βu)-(x'+αu')\}^2+\{(y+βv)-(y'+αv')\}^2+\{(z+βw)-(z'+αw')\}^2$$

the values of α and β which minimize the value of (e) are obtained using the expressions: de/dα=0 and de/dβ=0. In other words, by solving the equations of $$(U^2+v^2+w^2)α-(uu'+vv'+ww')β+(x-x')u+(y-y')v+(z-z')w=0$$

$$(U'^2+v'^2+w'^2)β-(uu'+vv'+ww')α+(x-x')u'+(y-y')v'+(z-z')w'=0$$

the values of α and β are determined, so that the depth of Point S is finally expressed as the following.

$$\{(z+αw)+(z'+βw')\}/2$$

Especially in the case that the error (e) is zero, the (z) coordinate of the midpoint coincides with that of the crossing point of Lines Lt and Lt'.

As an alternative method, Lines Lt and Lt' are both perspectively projected onto the screen of Frame t, so as to obtain the (z) coordinate of the closest point of Lines Lt and Lt'. In this approach, Line Lt is projected as one point on the screen, while Line Lt' is one line in general. With Line Lt' expressed as Equation 13, the (x) and (y) coordinates of the points on the projected Line Lt' on the screen are expressed as Equations 14 and 15 by dividing (x) and (y) coordinates of the points on Line Lt' in the 3-D space by their (z) coordinates, respectively.

$$x=f(x'+βu')/(z'+βw') \quad \text{[Equation 14]}$$

$$y=f(y'+βv')/(Z'+βw') \quad \text{[Equation 15]}$$

wherein (f) is an actual distance from the viewpoint to the screen of Frame t, which can be set as one. By eliminating β from Equations 14 and 15, Line Lt' after being projected (hereinafter referred to as Li) can be specified as follows.

$$Kx+my+fn=0$$

wherein k=v'z'-w'y', m=w'x'-u'z, n=u'y'-v'x'. The closest point to be detected is a foot of a perpendicular from the representative point Pt to Line Li (hereinafter referred to as Point D), that is, a point where a line drawn from the representative point Pt meets Line Li so as to form a right angle, and the coordinates of Point D are expressed as following Equation 16.

$$x=(m^2X-kn-kmY)/(k^2+m^2)$$

$$y=(k^2Y-mn-kmX)/(k^2+m^2) \quad \text{[Equation 16]}$$

Assuming that the original point on Line Lt' in the 3-D space, which corresponds to Point D, is designated as Point E (x",y",z"), Point E can be detected by substituting Equation 16 into Equation 14 to obtain β, and further substituting the obtained value of β into Equation 13. Since β is expressed as $$\beta=(xz'-fx')/(fu'-xw'),$$

by substituting this expression into Equation 13, the (z) coordinate of Point E, that is z", is determined as the following:

$$z''=z'+w'(xz'-fx')/(fu'-xw')$$

This can be used as a depth value of Point S.

When the depth value is negative due to errors caused in image processing, the computed value is not reliable because the negative value means that Point S exists behind the camera. Therefore, the (z) coordinate of Point S needs to be obtained in some other way, such as by using representative points close by with a positive value.

Figure 14:
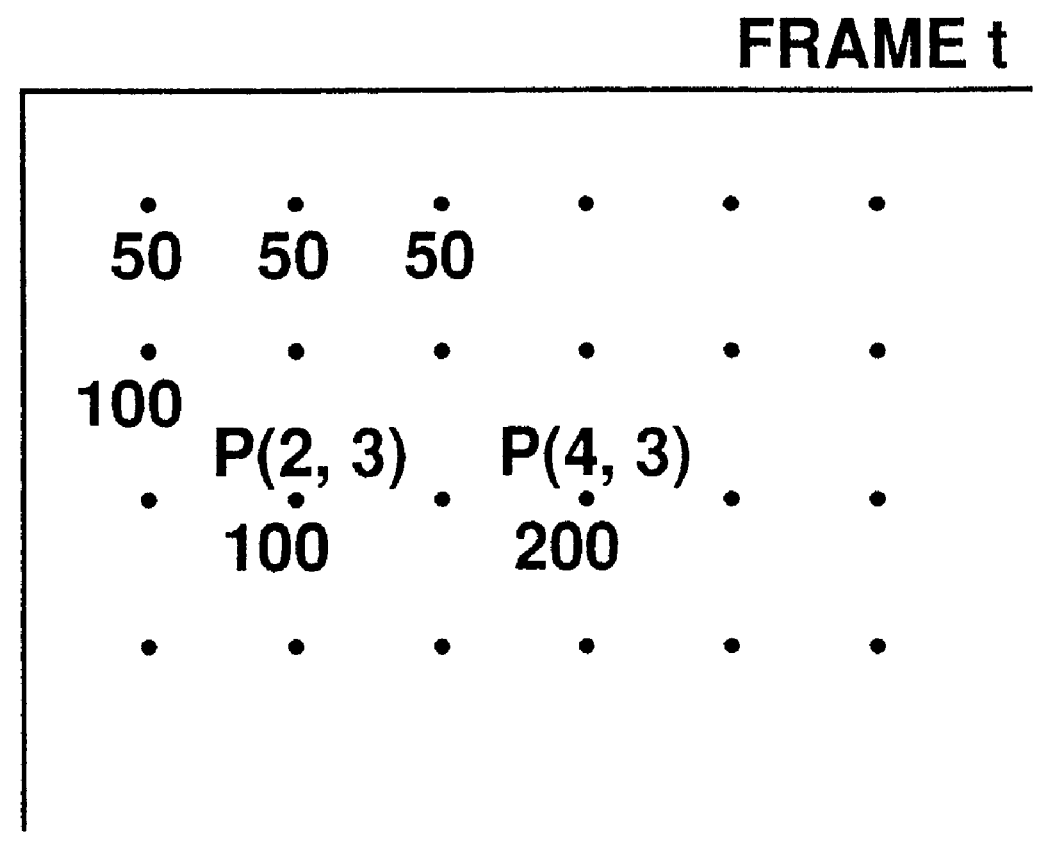

Irrespective of which method is utilized, the computed depths of the respective image parts should be given to the respective representative points as an actual numerical value. FIG. 14 shows representative points, each of which is given an actual numerical value. For example, the depth of Pt(2,3) and Pt'(4,3) are respectively 100 and 200, the latter actually being located twice as far away as the former.

[Stage 4] Creation of Image

A parallax is determined according to the depth information, which has been acquired in Stage 3, so as to create right and left images. In this stage, a farther image is to be provided with a smaller parallax.

Figure 15:
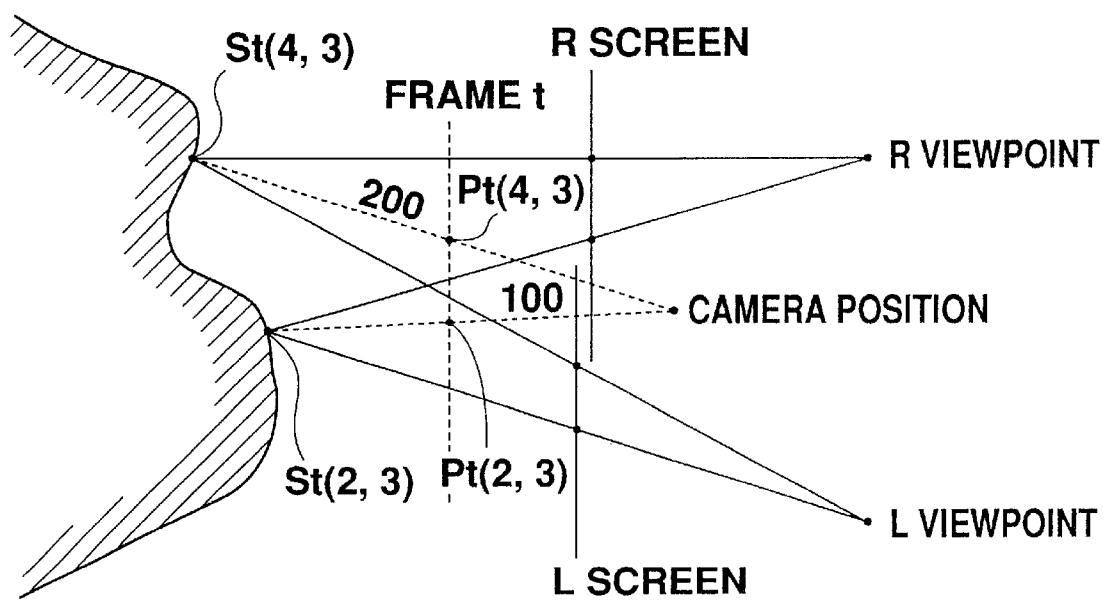
FIG. 15 shows a parallax given according to depth information.

In FIG. 15, which is a top view of the whole system including an object and a camera, parallaxes are given according to depth information. When Pt(2,3) and Pt(4,3) of FIG. 14 are provided on a viewfinder image shot by the camera under the situation shown in FIG. 15, their actual positions are at St(2,3) and St(4,3), respectively, the latter being located twice as far away from the camera as the former.

R and L screens and R and L viewpoints are respectively placed as shown in FIG. 15, the R and L viewpoints respectively corresponding to right and left eyes of a viewer. Then, St(2,3) and St(4,3) are projected on each of the R and L screens by viewing them from respective R and L viewpoints. This projection is carried out with respect to all representative points until a final image is formed on each of the R and L screens. The final images can be used as right and left images, respectively. By displaying such images on a display of lenticular lens type or the like, which is disclosed in JP Application Laid-Open No. Hei 3-65943, it is possible to obtain a good stereoscopic image.

Figure 16:
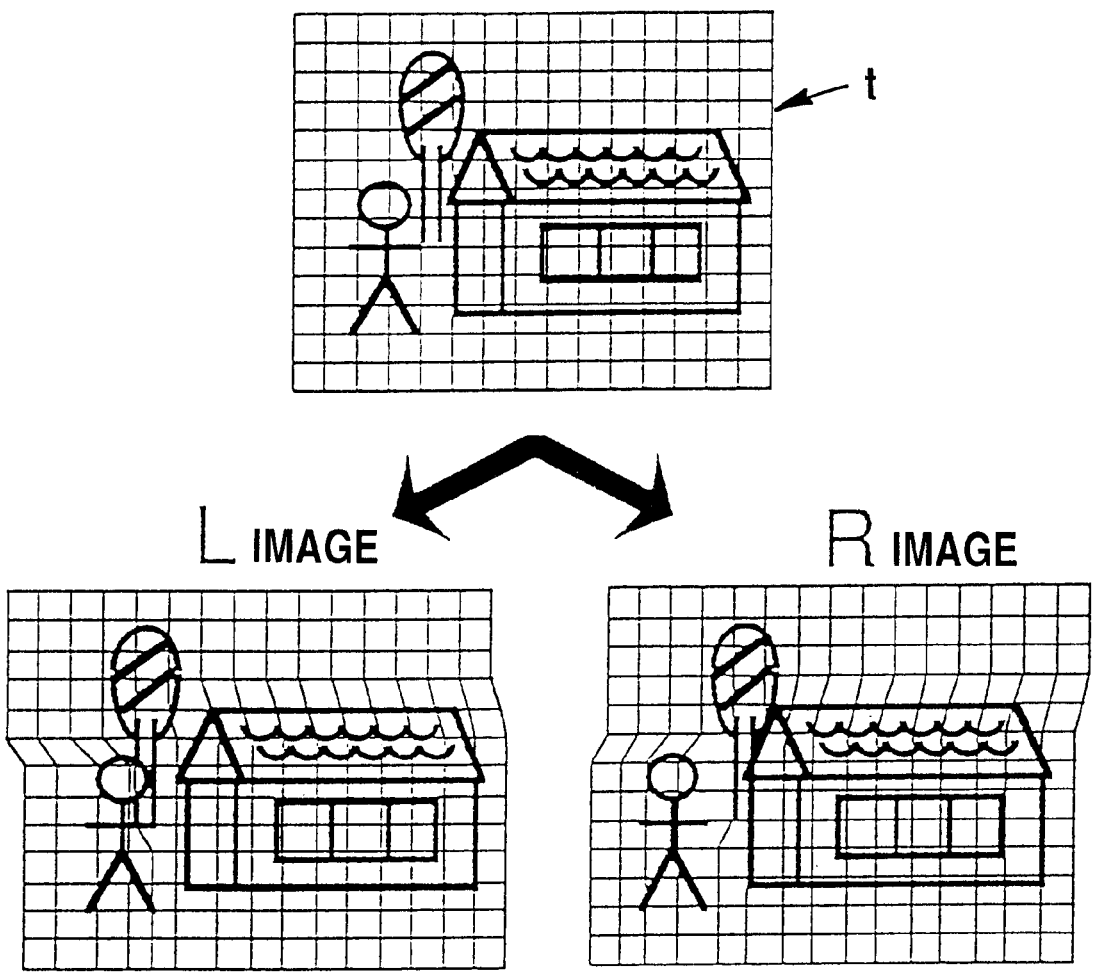
FIG. 16 shows right and left images created from Frame t.

In this embodiment, the stereoscopic image may be generated for a desired part only which has been separated from the image. Taking as an example a scene where a person is located 5 meters from the camera, with mountains in the background. Image processing on a condition of "within 10 meters in depth" would make it possible to separate the area including only the person from the whole image area, so that right and left images can be created with respect to only the area containing the person, while leaving the rest blank or pasting the area with the person on pre-prepared different images. This stage differs from stages up to Stage 3 in the number of a viewfinder image frame to be used. Up to Stage 3, at least two frames are used in extracting required information, though in Stage 4, one frame is sufficient for the creation of right and left images. FIG. 16 shows right and left images, which have been created using Frame t as reference, in which the image parts of a tree, a house and a person are respectively located a smaller distance from the viewer in this order. The image part of the person, closest to the viewer, exhibits the following features:

1. having a largest displacement to the left in a right image.
2. having a largest displacement to the right in a left image.

It is respectively understood that the above (1) is a situation where the viewer sees the person from a point which is slightly rightward from the original viewpoint, and the above (2) from a point which is slightly leftward from the original viewpoint. As a result of these features, the person is perceived as being a smaller distance from, that is closer to, the viewpoint. In FIG. 16, the displacements of the respective image parts are indicated by means of the movements of crossing points in the grid, in which the person, the house and the tree present a smaller displacement (a parallax) in this order.

For image creation based on Frame t, the respective divided parts of a viewfinder image in FIG. 16 are to be transformed. In this case, it is necessary to select either a linear or a non-linear transformation as follows.

1. Non-Linear Transformation

As is shown in FIG. 16, some of the divided parts are transformed into a trapezoid. A widely-used linear transformation, such as an affine transformation, however, cannot be applied to such transformation. Therefore, in order to transform a part with four vertexes into a trapezoid, a non-linear transformation, such as a perspective transformation, is applied.

2. Linear Transformation

In the transformation into a trapezoid, provided that a part with four vertexes is first divided into two parts each having three vertexes, a linear transformation can be applied with respect to such a part.

As a result of a horizontal displacement of respective image parts through the above mentioned transformation, the peripheral edge of the image may become uneven. In FIG. 16, the bottom parts of right and left images are displaced inwardly with respect to each other, and accordingly the peripheral edges of the displaced parts become crooked. Therefore, by adding pixels to such a recess, the shape of the image is corrected back into its original shape (a rectangle in this example).

The depth of an image part that falls on the added pixels is determined while referring to the depth of those close to the pixels, or in other ways. The images on the added pixels can be seen only by one of the eyes, which is a natural phenomenon and arises in an area close to a window frame when people look outside through the window. It is to be noted that this correction can also be made by deleting redundant pixels, which project outward of the edge. Alternatively, the peripheral part of the image is uniformly cut off by a certain width. With this correction, irrespective of the selection among the above methods, it is possible to maintain a natural display.

In this stage, a parallax is determined according to a depth, though the parallax is preferably further adjusted for the following reasons.

1. Eye Fatigue

In the above example, it is not desirable for even a person closest to the viewer to be given an extremely small depth, because an image perceived to be excessively frontward from the screen would cause fatigue on the viewer's eyes. According to a report in "Nikkei Electronics" (Apr. 4, 1988, p.211), it is most desirable for respective image parts to be given a depth in a range between 0.2 m to 2 m, when a display is positioned 50 cm from the viewer.

2. Personal Preference

Some people prefer a close image to be displayed much closer and a distant image much farther, while others prefer the opposite.

3. Processing Capacity

If all image areas constituting a far background, such as a mountain, are displayed as if having the same distance, the volume of data to be processed can be reduced.

Because of the foregoing reasons, in this stage, the following functions for transforming a depth or a parallax are applied as requested.

1. Depth Transformation Function

A depth is directly subject to either a linear or a non-linear transformation. That is, the object of the transformation is a depth, and a parallax is resultantly changed. For example, as for a viewfinder image comprising image parts with depths in the range of 1a to 10a ((a) being an arbitrary value), the depths of the respective image parts can be uniformly multiplied by ten, so that all depths fall in the range of 10a to 100a. This depth transformation function is advantageous for a viewfinder image with an excessively small depth as a whole.

Alternatively, when the depth is in the range of 0 to 100a, the depth may be compressed, for example, to the range such as 25a to 75a with 50a as the origin of transformation. As a further alternative, all images having a depth of equal to or less than 20a, or equal to or more than 1000a may be transformed so as to have a uniform 20a or 1000a depth, respectively. In this case, however, as a result of the uniform transformation, areas at the upper and lower limitation values, that is 1000a and 20b, become discontinuous, and thus form an unnatural display in some viewfinder images. In order to solve this problem, a non-linear transformation is applied such that images smoothly converge at the upper and lower limitation values. In this example, the following transformation should be made;

$$z \to \alpha/\{1+\exp(-(x-0.5\alpha)/\alpha T)\}+z0$$

wherein (z) is the original depth, $z0=20a$, $\alpha=1000a-20a=980a$, and $T=4$.

2. Parallax Transformation Function

A parallax is subject to a linear or a non-linear transformation. That is, after a parallax is calculated based on a depth and transformed, the depth is re-calculated based on the transformed parallax.

Figure 17:
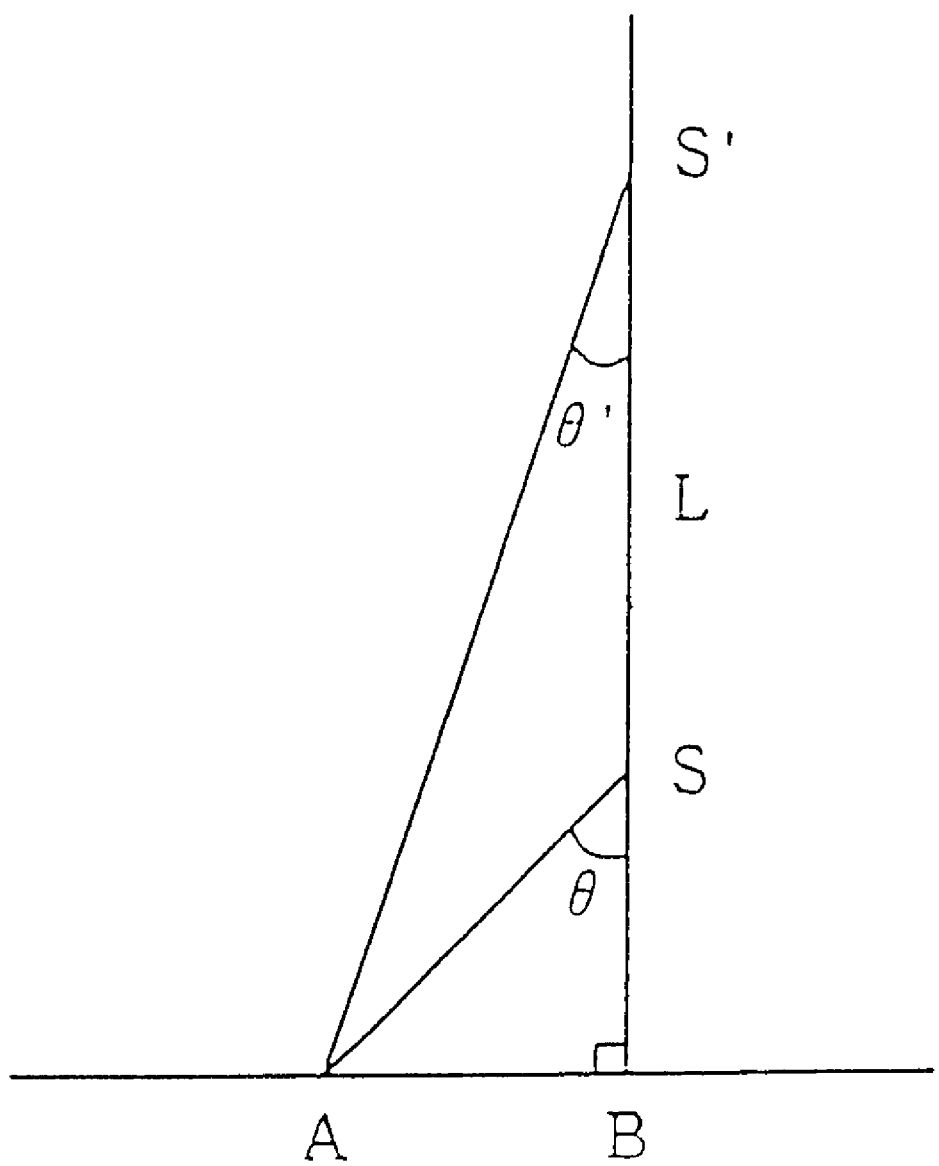
FIG. 17 shows a non-linear transformation with respect to a parallax.

FIG. 17 shows a non-linear, transformation to a parallax, in which Point S, an object for the transformation, is provided on a central line L and Point B is at the foot of a perpendicular from Viewpoint A to the Line L. The depth of Point S is expressed by a segment SB, and the parallax e (strictly speaking, a half of the parallax) is set as shown in FIG. 17.

Taking as an example a case where the parallax is reduced to a half. That is, Point S is to be transformed to a point which satisfies the following Equation 17, that is Point S'.

$$\theta'=\theta/2 \qquad \text{[Equation 17]}$$

The depth of Point S' is expressed with a segment S'B. A series of processes in connection with the transformation will be mathematically explained. First, e is determined using the depth SB, according to the relationship of $$\theta = a\,\tan(SB)$$

S'B is next determined according to the relationship of $$S'B = \tan\theta'$$

so that S'B will be used as depth information after the transformation. Since a far point is transformed to be much farther and a close point is much closer than through a simple linear transformation, the sense of depth is more effectively adjusted through this transformation. Equation 17 expresses a simple linear scaling, although a variety of non-linear transformations, such as is described in 1 (Non-Linear Transformation), can also be applied to the transformation of $\theta' \to \theta$.

According to Embodiment 1 of the present invention, an image is newly created based on depth information, instead of a combination of existing viewfinder images. Since this creation does not require a horizontal movement, which has been a mandatory in a conventional time difference method, the present invention is applicable over a wider range. In addition, since a method for detecting a corresponding point with respect to a representative point is disclosed in the present invention, it is possible to automate the extraction of depth information and creation of an image with ease and efficiency.

Embodiment 2.

The optimum apparatus for practicing Embodiment 1 will be described.

Figure 18:
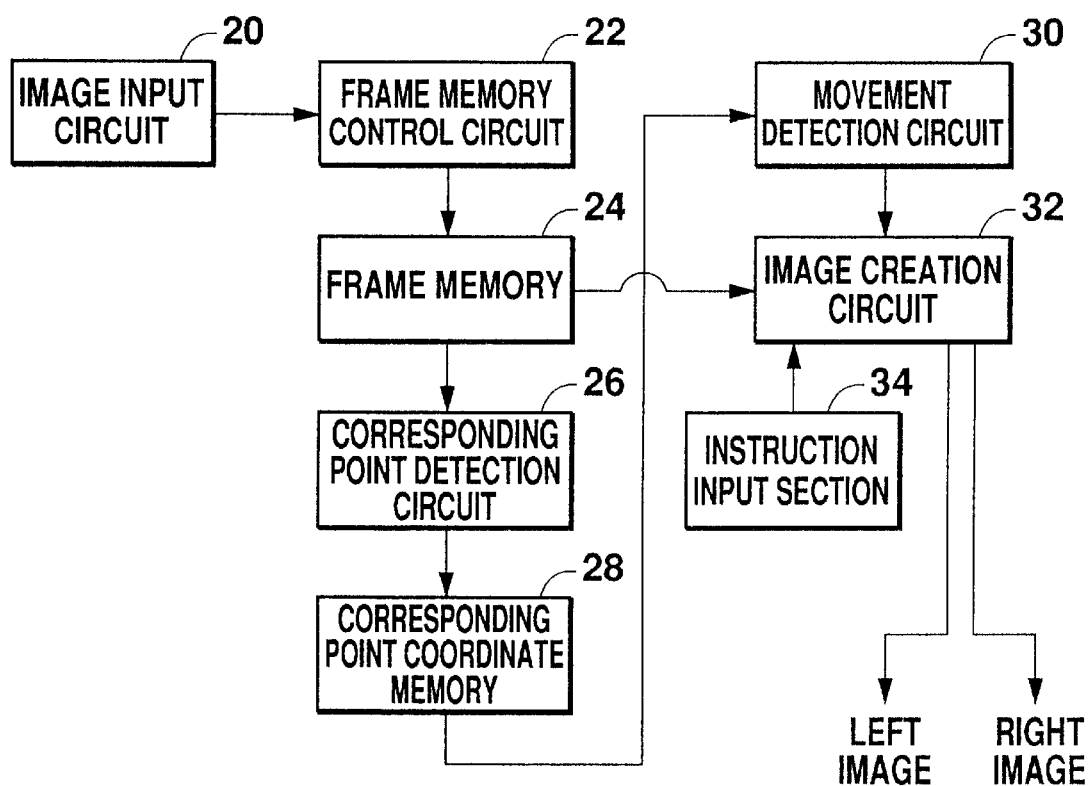
FIG. 18 shows an example of a hardware structure for practicing Embodiment 1.

FIG. 18 shows a hardware structure for practicing Embodiment 1.

In FIG. 18, a viewfinder image to be processed is supplied via an image input circuit 20, whereupon it is converted into a digital signal. The digital viewfinder image is stored by a frame memory control circuit 22 in a frame memory 24. Subsequent to the memory 24, a corresponding point detection circuit 26 is provided for reading out a plurality of viewfinder image frames for detection of corresponding points. In the detection circuit 26, the process at Stage 1 of Embodiment 1 is practiced by means of hardware, in which an MPEG encoder or the like is used for block matching.

The coordinates of corresponding points, which have been detected in the circuit 26, are stored in a corresponding point coordinate memory 28, so as to be arbitrarily read out by a movement detection circuit 30. In the movement detection circuit 30, the processes at Stages 2 and 3 of Embodiment 1 are practiced, in which a 3-D relative position of the object is calculated based on its translation and rotation movements.

The calculated information about the 3-D relative position is supplied to an image creation circuit 32, where the original digital viewfinder image is retrieved from the frame memory 24 so as to create right and left images, respectively, by giving an appropriate parallax between them. Prior to the image creation circuit 32 an instruction input section 34 is provided for receiving several instructions from outside.

The right and left images, which have been created in the image creating circuit 32, are converted into an analog signal by an image output circuit 36, to be supplied to an unillustrated display.

The operation of the apparatus will next be described.

A camera shoots an object so as to capture its viewfinder image. Or, a video equipment plays a viewfinder image. Such a viewfinder image is supplied via the viewfinder image input circuit 20, so as to be stored in the frame memory 24. For a normal 2-D display, the supplied viewfinder images will be displayed intact, or alternatively the viewfinder images stored in the frame memory 24 are sequentially read out therefrom for display. For a 3-D display, a plurality of frames on a viewfinder image are read out from the frame memory 24, so that depth information of the object will be obtained from the read-out frames, with the corresponding point detection circuit 26 and the motion detection circuit 30. Subsequently, the image creation circuit 32 creates right and left images according to the depth information.

The instruction input section 34 can be structured as follows so as to achieve the following functions.

1. Structured as a Control Knob

The sense of depth on the created image can be adjusted so as to satisfy the personal preferences of a user by varying the sense of depth through scaling depth with a control knob. The rotation of the knob may be adjusted in advance such that the minimized sense of depth will provide a 2-D display.

2. Structured as a Pointing Device (1) The sense of depth is adjustable in units of image parts. For example, when the person in FIG. 16 is desired to be displayed much closer, a pointing device, such as a mouse, is used to point to the person, and then clicked. As a result, the image creation circuit 32 transforms the depth information of the person for use in an enhanced display by giving a wider parallax. The effect of this adjustment will become more significant if the display area of the selected item is also changed together with the change of the sense of depth. Concretely speaking, with the halved sense of depth, the display area of the selected item will be expanded four times.

(2) A viewfinder image seen from a different point can be created. Since the depth information is available, by designating a shooting point (a viewpoint) of the object through clicking with a mouse, it is possible to compute through a calculation of translation and rotation movements of the respective image parts, the movements to be caused accompanying the change of the viewpoint. Therefore, a viewfinder image to be seen from a different point can be created. In FIG. 16, for example, a viewfinder image to be seen after the viewpoint is changed in height or by advancing or withdrawing the camera, can be re-created. Further, since the depth information of the re-created viewfinder image can be computed through the calculation, its 3-D display can be maintained in a good condition with the parallax changed according to the newly computed depth information. A viewfinder image seen from a different point will be further described later in Embodiment 5.

In the following, the results of experiments, in which the apparatus of the present invention is mounted in a work station, will be described with reference to the drawings.

FIGS. 19 to 26 show image creation procedures with the apparatus according to the present invention. Each of the drawings is a B/W picture on a display which comprises an area including about 640×480 pixels.

Figure 19:
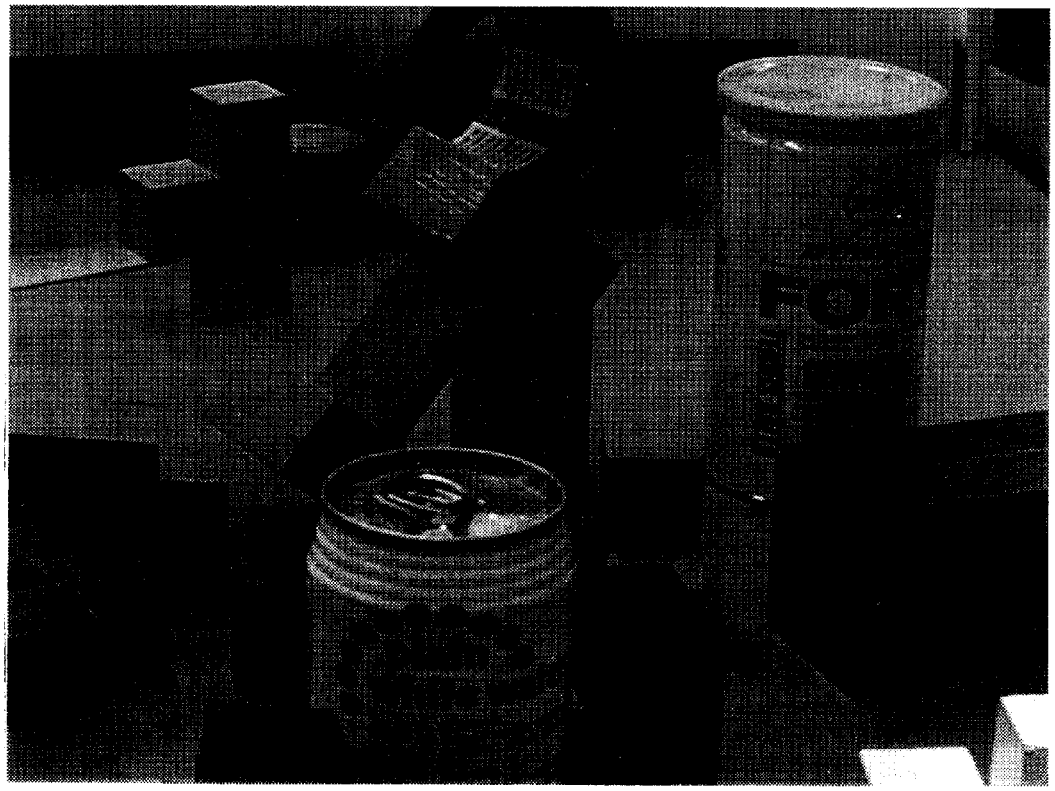
FIG. 19 is a monochrome picture showing a viewfinder image in Frame t.
Figure 20:
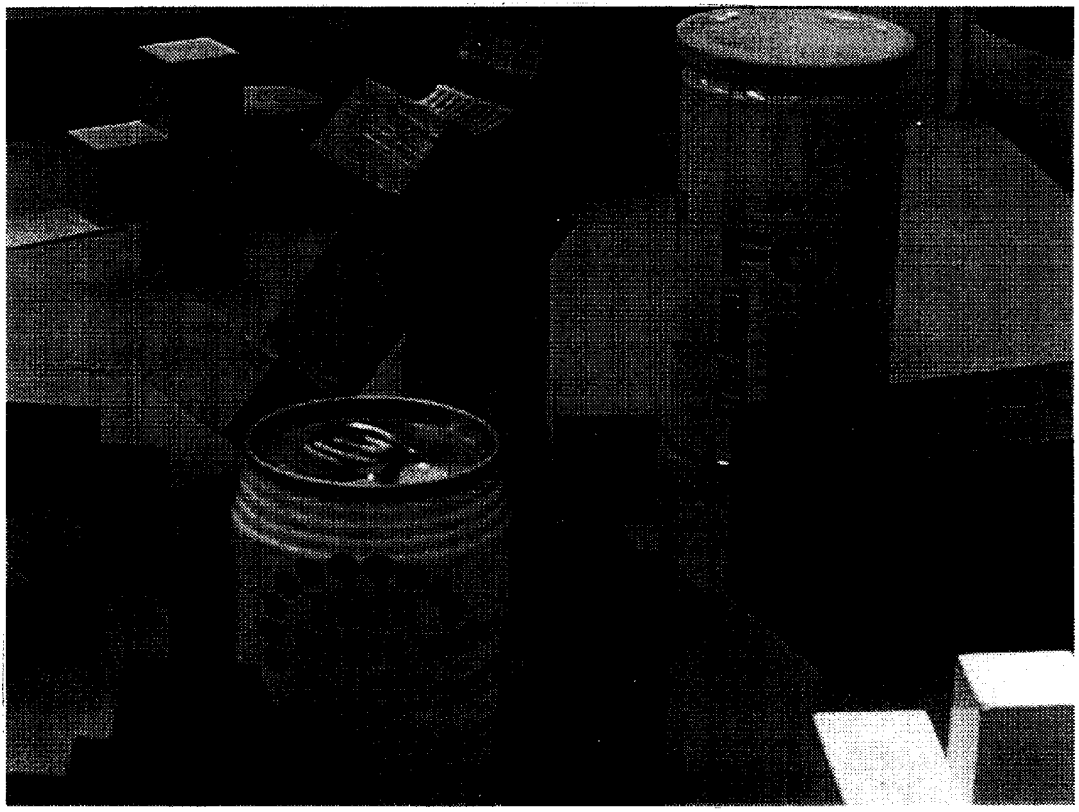
FIG. 20 is a monochrome picture showing a viewfinder image in Frame t'.
Figure 21:
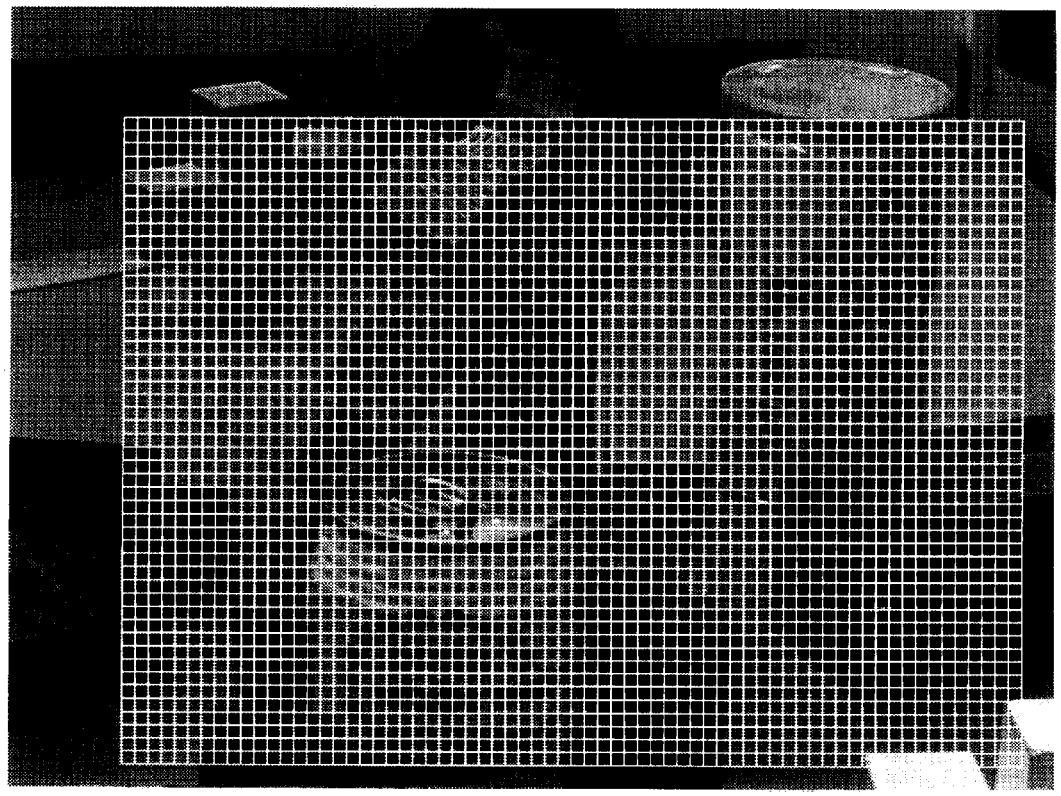
FIG. 21 is a monochrome picture of Frame t overlaid with a grid for division, and provided with representative points
Figure 22:
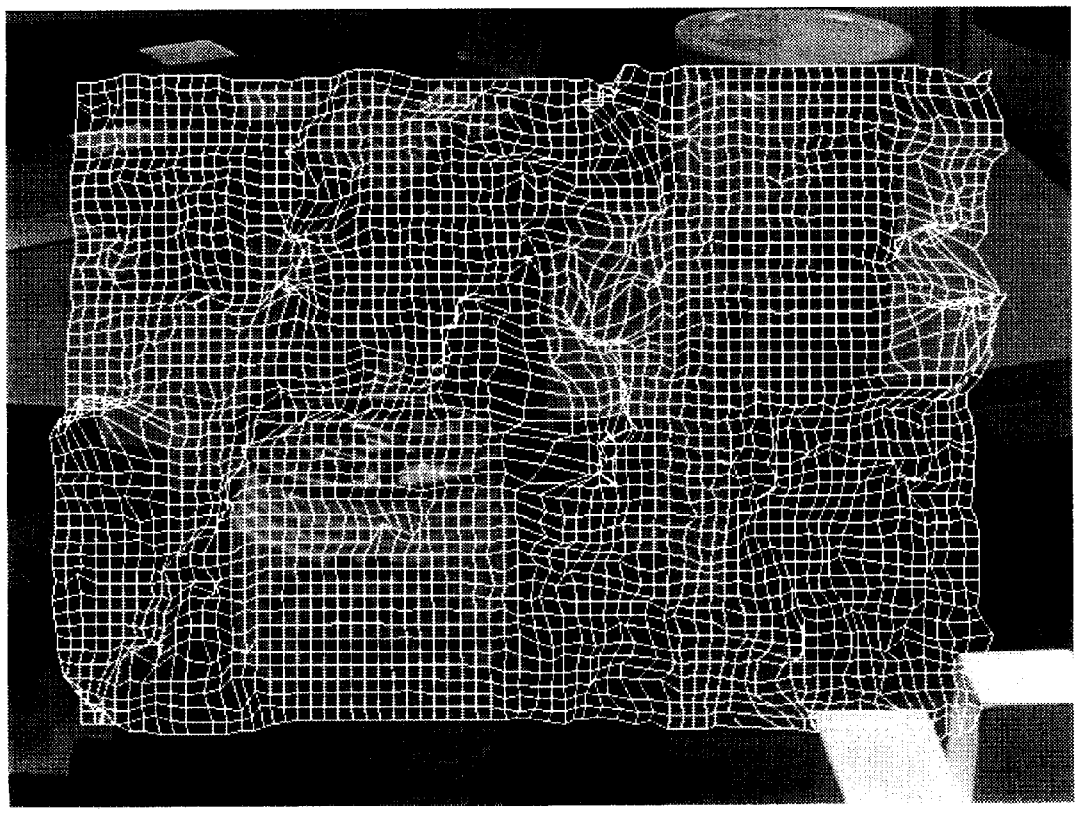
FIG. 22 is a monochrome picture showing initial positions of corresponding points in Frame t'.

FIGS. 19 and 20 are viewfinder images in Frames t and t', respectively, exhibiting some movements between them due to a positional difference of the camera. FIG. 21 shows the same viewfinder image of FIG. 19, with a grid overlaid and representative points provided. FIG. 22 shows the same viewfinder image of FIG. 20, with corresponding points at their initial position, in which the initial position is set at the temporary best point. The temporary best point is obtained through block matching, which has been conducted, beginning with a characteristic point, with respect to an area of 16×16 pixels with a representative point at its center.

Figure 23:
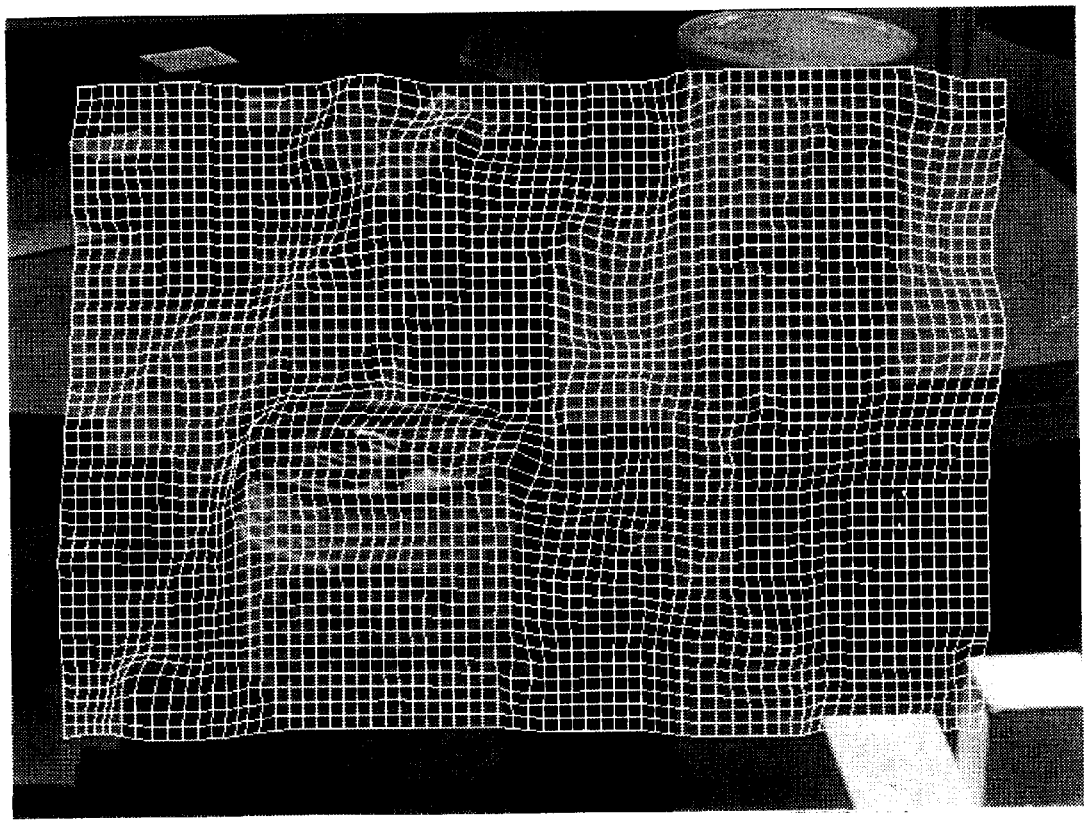
FIG. 23 is a monochrome picture showing corresponding points at improved positions in Frame t'.

FIG. 23 shows improved positions of corresponding points, presenting a significant improvement from FIG. 22, as a result of Equation 3 in Embodiment 1 for considering a positional relationship between corresponding points.

Figure 24:
FIG. 24 is a monochrome picture embodying depth information with a gray-scale image.

FIG. 24 expresses depth information at a gray level, where a lighter level represents a smaller depth. It can be seen from the drawing that depth information has been acquired with considerable accuracy.

Figure 25:
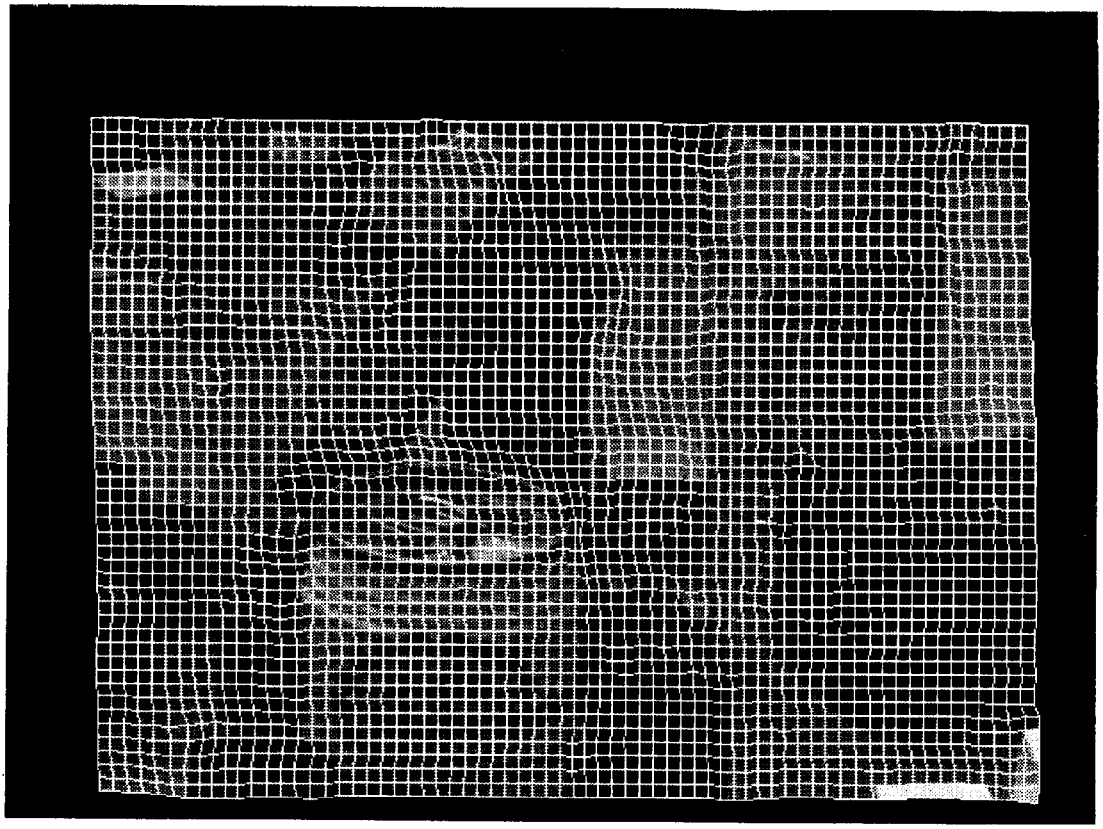
FIG. 25 is a monochrome picture of a right image created according to depth information.
Figure 26:
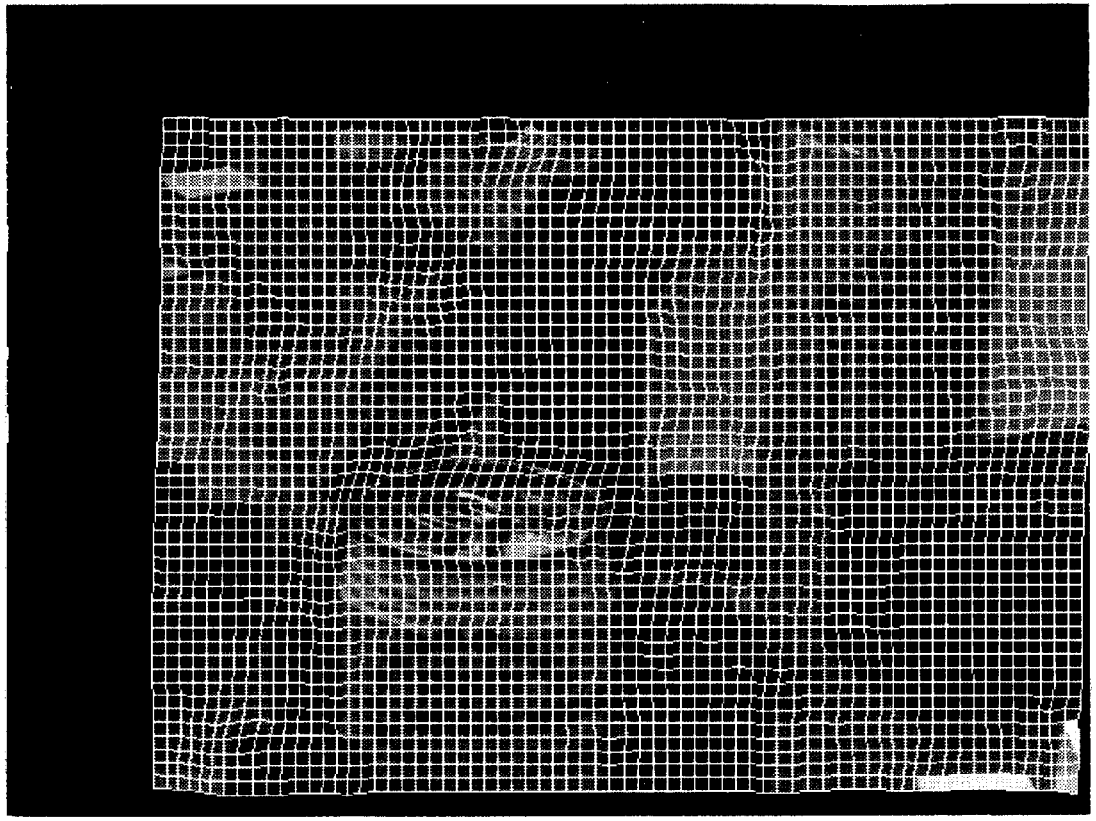
FIG. 26 is a monochrome picture of a left image created according to depth information.

FIGS. 25 and 26 are right and left images, respectively, which are created based on depth information. A closer object, a can in this example, is shown to have a wider parallax, and is thus given a larger horizontal displacement.

As described above, with the present apparatus, it is possible to automatically practice the method of Embodiment 1 of the present invention. Further, the application of hardware for block matching contributes considerably to the improvement of processing speed, compared to an executing time required with the application of a software.

The present apparatus can be effectively embodied in a product by attaching an add-on-card having the structure as shown in FIG. 18 to a personal computer or a work station, or pre-installing a circuit having the structure as shown FIG. 18 in a television receiver, a video player or the like. Further, by combining the present apparatus with a camera, it is also possible to shoot an object separately from its surroundings in order to capture many viewfinder images seen from different points, so as to produce a catalogue containing 3-D pictures of the object. With this way of shooting, depth measurement by means of a laser, infrared rays, or supersonic waves, which have been conventionally necessary, are no longer necessary.

Embodiment 3.

Contrary to Embodiments 1 and 2, in which a monocular camera shoots an object, in Embodiment 3, a multi-eye camera system is used to capture a stereo viewfinder image. The captured stereo viewfinder image is used for the creation of an image for a 3-D display. In the following, a method for such an image creation is described mainly in view of the difference from Embodiment 1.

Figure 27:
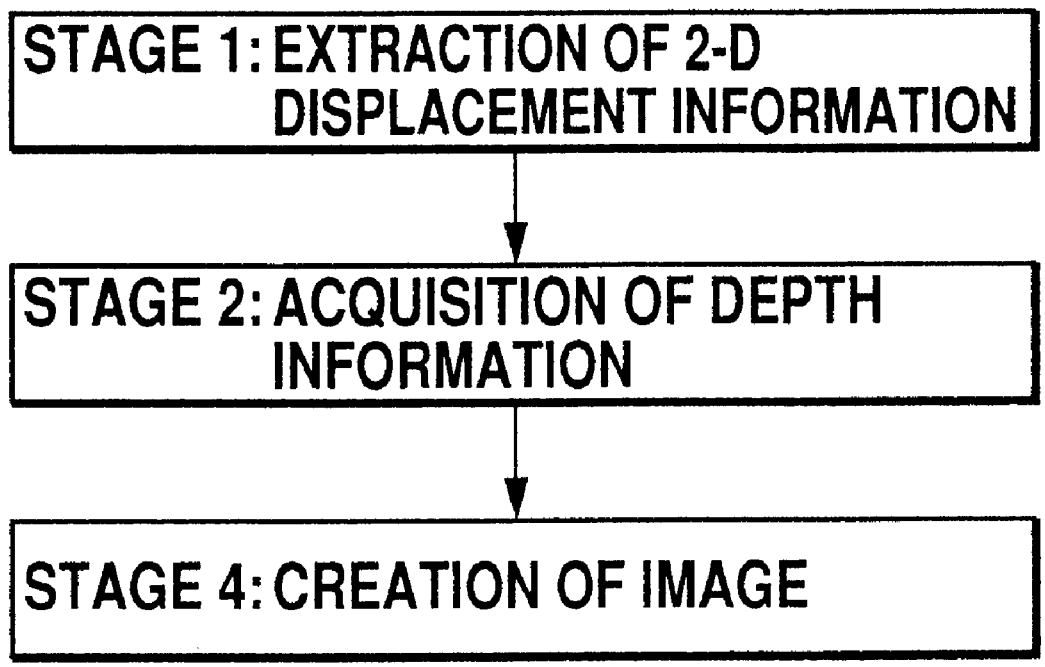
FIG. 27 shows main stages for the creation of an image for a 3-D display according to Embodiment 3.

FIG. 27 shows main stages through which an image for a 3-D display is created. The difference from the stages in FIG. 4 of Embodiment 1 is the following.

1. At Stage 1 in Embodiment 3, displacement information is extracted instead of the motion information in Embodiment 1.

While different-time frames are processed in Embodiment 1, same-time frames are mainly processed here in Embodiment 3. Between frames shot at the same time, the movement of an object cannot be defined. Thus, information about the object displacement between such frames is extracted instead.

2. Stage 2 in FIG. 4 is unnecessary in FIG. 27

FIG. 27 does not include a stage corresponding to Stage 2 in FIG. 4 (Calculation of a 3-D Motion Information) because the distance between cameras is already known as shown in FIG. 13 and depth information can be obtained according to the principle of triangulation using the distance.

When inaccuracy could be caused with respect to the relative positional relationship between a plurality of cameras of a multi-eye camera system, it is desirable to use self-calibration to correct such inaccuracy at Stage 2. Methods for self-calibration are described in references such as "Self-Calibration of Stereo Cameras" by Tomita and Takahashi, Journal of the Information Processing Society of Japan, Vol. 31, No.5 (1990) pp.650–659, JP Laid-Open No. Hei 2-138671 and JP Laid-Open No. Hei 2-138672.

Stages 1 to.3 of Embodiment 3 will next be described.

[Stage 1] Extraction of 2-D Displacement Information

In addition to the substitution of motion information with displacement information, Frames t and t' are replaced by Frames 1 and 2, which are respectively shot by Camera 1 and 2 at Time t. In Embodiment 3, it is possible to create a final image based on a minimum of only two frames, which are shot at the same time, that is, Time t. In other words, when shooting using a multi-eye camera, the viewfinder image captured may be a still image. Stage 1 is further different from Embodiment 1 as follows.

(1) In Step 11 of Embodiment 1 (Setting a Corresponding Point Candidate Area), the amount of calculation is reduced with the appropriate selection of different-time frames or the limitation of a corresponding point candidate area, which are conducted based on the intensity or the trails of the movement of a viewfinder image. In Embodiment 3, on the other hand, a different method from that in Embodiment 1 is employed as described in the following to limit a corresponding point candidate area for the same purpose.

It is assumed that a multi-eye camera is positioned horizontally, as is usually the case. Y coordinates (a vertical coordinate) of corresponding points in frames shot by cameras of the multi-eye camera system are substantially the same as one another. Taking this into consideration, as well as errors due to image processing or camera installation, a corresponding point candidate area can be limited to a horizontally longitudinal band area. Moreover, it is assumed that Frames 1' and 2' are shot at Time t' and Frames 1 and 2 at Time t, respectively, wherein t'=t−1. When a positional difference of the representative points between Frames 1' and 2' is x, it can be predicted that corresponding point candidate areas in Frames 1 and 2 be set so as to have the same difference of x, or thereabouts, between each other. In other words, the corresponding point candidate areas in Frames 1 and 2 can be limited to the regions, the difference between which is about x.

(2) Although statistical analysis is introduced for a slow movement in Step 12 of Embodiment 1 (Calculation of non-similarity in the area for candidates for a corresponding point), this analysis is unnecessary in Embodiment 3.

(3) Similarly to Step 12 in Embodiment 1, block matching is introduced in determining positions of corresponding points in Embodiment 3. However, in Embodiment 3, biased block matching may be more effective than simple block matching in some cases, such as when the multi-eye camera system to be used ifs constituted of cameras with different characteristics. For example, if Camera 2 tends to produce more bluish images than Camera 1, the color density of Frame 2 should have its blue components (B) subtracted to a certain extent (that is, a color deflection constant $\alpha_B$) before undergoing block matching. Without such an adjustment, there is a risk that the meaning of E3 for combing E1 and E2 may become invalidated. An example will be taken where a color density is expressed in red, green and blue spaces. In such a case, not only blue (B), but also red (R) and green (G) should undergo such an adjustment through subtraction of color deflection constants $\alpha_R$ and $\alpha_G$, respectively. Note that the biased block matching evaluates the similarity, based on a squared difference of gray-scale level. This means that the similarity can be treated as a distance in the color space, which is the same metric as is used for relative positional acceptability of viewfinder images. Therefore, the similarity and the acceptability can be combined together and can be used for the matching evaluation.

Referring to FIG. 7 and based on Equation 1, biased block matching will be described using equations. Pt(i,j) in Embodiment 1 is denoted as P1 and P2 respectively corresponding to Frames 1 and 2, and It(i,j) is as I1 and I2. Since Equation 1 can be simplified to be expressed as Equation 18, Equation 18 can be used in normal block matching with respect to a gray-scale image.

$$E1=\Sigma\Sigma\{I1(P1x+u,P1y+v)-I2(P2x+u,P2y+v)\}^2 \qquad [\text{Equation 18}]$$

On the other hand, biased block matching is represented by following Equation 19, which is a modification of Equation 18.

$$E1=\Sigma\Sigma\{I1(P1x+u,P1y+v)-I2(P2x+u,P2y+v)-\alpha\}^2 \qquad [\text{Equation 19}]$$

For a color image, with a being any one of $\alpha_R$, $\alpha_G$, and $\alpha_B$, E1 is calculated for all viewfinder images in all RGB spaces, so as to obtain the total thereof, that is, $E1_R+E1_G+E1_B$, which is used in block matching. For simplicity, Equation 19 can be expressed as Equation 20, with I1 and I2 representing I1(P1x+u, P1y+v) and I2(P2x+u, P2y+v), respectively, $$E1=\Sigma\Sigma(I1-I2-\alpha)^2 \qquad [\text{Equation 20}]$$

wherein I1 and I1 are functions of u and v, respectively, and a is a constant.

The optimum value of a is obtained next. Since Cameras 1 and 2 shoot the same object, viewfinder images captured by both cameras should comprise substantially the same content, except for the displacements of the respective image parts. In other words, the more similar the characteristics of the cameras are, the smaller the value of E1 in Equation 20 becomes. Based on this fact, it is known that a should be a value which can minimize the value of E1. Since Equation 20 can be expressed as Equation 21, $$E1 = \sum\sum\{(I1-I2)^2 - 2\alpha(I1-I2) + \alpha^2\} \qquad [\text{Equation 21}]$$
$$= \sum\sum(I1-I2)^2 - 2\alpha\sum\sum(I1-I2) + \sum\sum\alpha^2$$

provided that the total number of pixels in a block is N, Equation 21 is further expressed as Equation 22, for $\Sigma\Sigma 1=N$ $$E1=\Sigma\Sigma(I1-I2)^2-2\alpha\Sigma\Sigma(I1-I2)+N\alpha^2 \qquad [\text{Equation 22}]$$

Therefore, since $$dE1/d\alpha=-2\Sigma\Sigma(I1-I2)+2N\alpha$$

is held, the value of El is minimized when Equation 23 is held.

$$\alpha=\{\Sigma\Sigma(I1-I2)\}/N \qquad [\text{Equation 23}]$$

Since α can be understood as an average difference value in color densities of respective pixels between two subject areas of block matching, a substitution of Equation 23 into Equation 22 would lead to Equation 24.

$$E1=\Sigma\Sigma(I1-I2)^2-\{\Sigma\Sigma(I1-I2)\}^2/N \qquad [\text{Equation 24}]$$

Therefore, it is concluded that Equation 24 is used for biased block matching. With the introduction of Equation 24, if it is assumed that Cameras 1 and 2 shoot exactly the same object, the value of E1 becomes zero. On the other hand, the value of E2 also becomes substantially zero. Therefore, it is understood that biased block matching is effective in eliminating an initial error caused by the judgement as to the similarity of viewfinder images. Afterwards, the best matching will be searched through the same process as that in Embodiment 1.

It is to be noted that a color density other than an RGB density, such as an HVC density, may also be applied without a problem for block matching. Moreover, block matching may be carried out based on a color difference, that is a residual difference, instead of a squared difference of gray-scale level. When a correction value a, which has been determined by Equation 23, exceeds a predetermined value range, a biased block matching may be discontinued. It is necessary to provide such a maximum limitation value, without which, sometimes the block matching may detect an incorrect corresponding point because the block including a point at issue has accidentally the similar pattern although it has a quite different color. However, since the color difference caused by camera characteristics is generally not very large and therefore is within a predetermined limitation range, an introduction of such a limitation value would be useful and practical.

Figure 28:
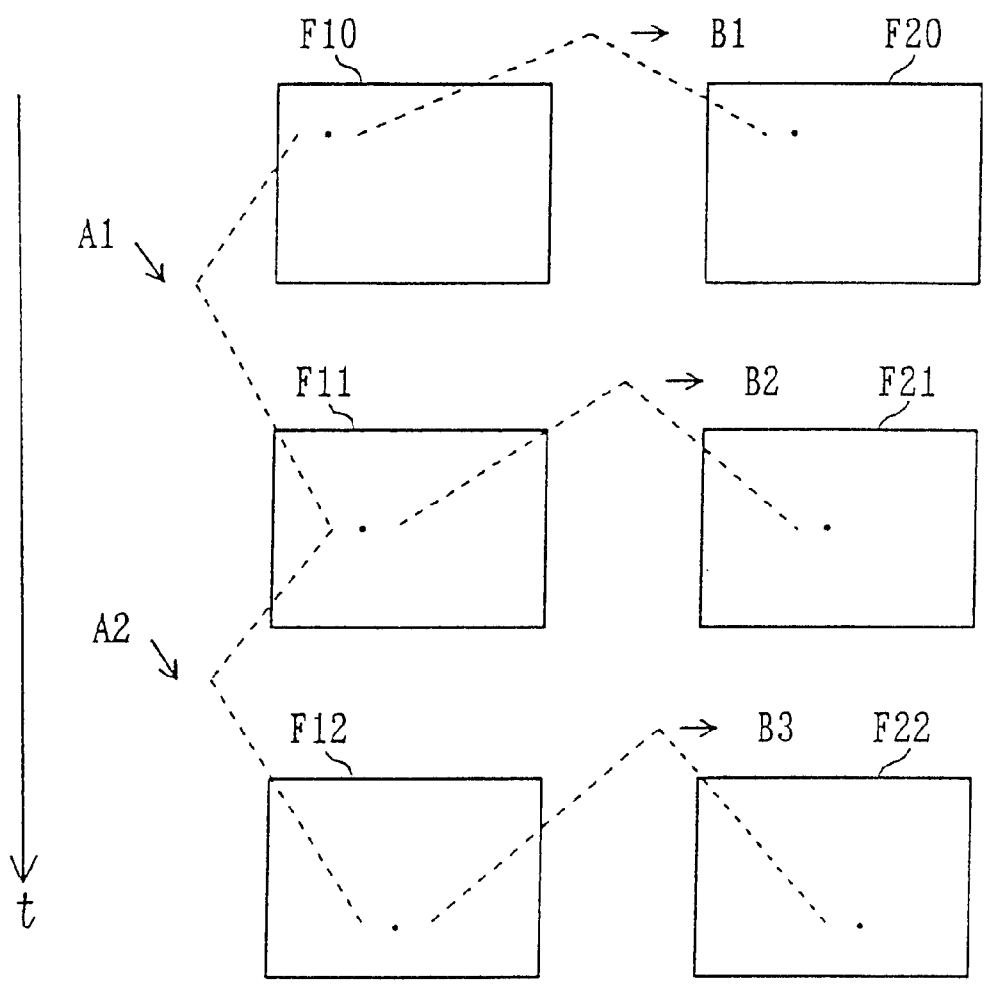
FIG. 28 shows a selection criteria with respect to a characteristic point which is introduced in Embodiment 3.

With the biased block matching discontinued, normal block matching may be used to evaluate the similarity of viewfinder images. Alternatively, the value derived from the biased block matching may be used after correcting image parts only at the upper limited value of a correctable range (hereinafter referred to as T), which can be computed with the following equation.

$$E1=\Sigma\Sigma(I1-I2)^2-\{\Sigma\Sigma(I1-I2)\}^2/N+Nx^2$$

wherein $x=|\Sigma\Sigma(I1-I2)/N|-T$ (4) In Step 13 of Embodiment 1 (Determination of an Initial Position of a Corresponding Point), a point with a stable movement among-different-time Frames t, t' is further selected as a characteristic point. In Embodiment 3, additional criteria are considered for the selection. In FIG. 28, Frames 10 to 12 constitute different-time frames to one another shot by Camera 1, while Frames 20 to 22 constitute different-time frames shot by Camera 2. Two frames shown side by side in FIG. 28 constitute same-time frames as each other. While directing attention at Point P in respective frames, its movement between the different-time frames is expressed with a vector An (n being a natural number), and its movement between the same-time frames with a vector Bn.

When set as described above, a point which meets the following criterion will be selected as a characteristic point.
(a) vector Bn is substantially consistent or moves substantially consistently.

In addition to the above criterion (a), the following criterion (b) may be added, so as to select a point which meets the both criteria as a characteristic point.
(b) vector An is substantially consistent or moves substantially consistently.

Criterion (b) corresponds to the condition introduced in Embodiment 1. As described above, when a shooting with a multi-eye camera system, it is possible to obtain depth information from same-time frames only. For this, it is necessary to obtain a correct corresponding relationship between viewfinder images. In obtaining the correct corresponding relationship, information obtainable from different-time frames is encouraged to be allowed in addition. Since it is considered as having been accurately traced, a point which simultaneously meets the above two criteria will provide key information in the extraction of 2-D displacement information. When a camera captures a still viewfinder image, the known dynamic programming may be applied to obtain corresponding points.

[Stage 2] Acquisition of Depth Information

Depth information is calculated based on the displacement of respective image parts, which has been obtained at Stage 1. In multi-eye shooting, where the situation of FIG. 13 is achieved at time t, depth information can be obtained by the method disclosed at Stage 3 of Embodiment 1.

It is to be noted that, since respective cameras of the multi-eye camera system are situated having a fixed relationship with one another, assumed that the relationship among them and their magnification rates (a focal distance) are known, depth information in a real (absolute) value can be obtained, including a scale factor k, which can not be determined in Embodiment 1.

[stage 3] Creation of an Image

An image is created through the same process as that at Stage 4 in Embodiment 1 (Creation of an Image).

In Embodiment 3, as described in the above, a camera receives a stereo viewfinder image and outputs an image for a 3-D display. Therefore, the viewfinder image captured by the camera will be precisely reproduced for output, in addition to the fact that a desired image can be created through image processing, including an enhanced display, as described in Embodiment 1.

Embodiment 4.

A technique for creating a viewfinder image seen from a different point, by utilizing a mouse and its clicking action is described in Embodiment 2. In the following, examples will be described, where various viewfinder images seen from different points are created for a variety of purposes.

As described above, according to the present invention, it is possible to create a viewfinder image seen from a different point without moving a camera. In this case, naturally, a viewfinder image seen from a viewpoint which is hypothetically located a shorter distance from the actual viewpoint will result in greater accuracy. By utilizing this fact, the following applications can be achieved.

1. The creation of a viewfinder image with multi-viewpoints, based on a viewfinder image shot by a double-eye camera.

When a stereo viewfinder image is available with a double-eye camera system, a viewfinder image with multi-viewpoints will be created by hypothetically providing a third camera. In other words, a point at which the hypothetical third camera is placed is determined so that the third camera is set apart from the other cameras by a small space. Then, a viewfinder image seen from the thus determined point is created. The thus created image, which is relatively accurate, and two viewfinder images actually captured by the two cameras of the double-eye camera system are combined together, so as to create a good viewfinder image with multi-viewpoints. Subsequently, additional considerations of depth information would permit the creation of an image for a 3-D display, which is seen from any of the multi-viewpoints.

2. Creation of a Viewfinder Image in Slow Motion

The closest two different-time Frames in terms of time are designated respectively as Frame t and t'; viewpoints of Frames t and t' are designated respectively as Viewpoint t and t'. Although the viewpoint is actually changed from Viewpoint t to t' from Frame t to t', no viewfinder image between them is available. Therefore, by providing a hypothetical viewpoint between Viewpoints t and t', a viewfinder image seen from a different point, that is, a point between Viewpoints t and t' in this example, is newly created. A plurality of viewfinder images seen from different points are created in this way. Then, a sequential display of such viewfinder images would present a viewfinder image in slow motion, which has the following effects.

a. The movement among respective viewfinder images becomes smooth, instead of an original flickery movement.

b. With a smaller movement of a viewpoint between closer frames in terms of time, the quality of the viewfinder image between those frames is not degraded.

c. Variation in a path where a viewpoint moves from Viewpoint t to t' would provide a different effect on the viewfinder image in slow motion.

Additional considerations of depth information would permit the creation of an image for a 3-D display. It is to be noted that the above mentioned technology can be applied to same-time frames without problems.

Embodiment 5.

Embodiment 5, which is substantially the same as Embodiment 1 expect that it outputs an image for a 2-D display, aims to practice the following image processing using depth information.

1. Change in a Viewpoint

Accompanying the hypothetical change of a viewpoint, a viewfinder image should also be varied. According to the present invention, when the viewpoint is hypothetically changed, a viewfinder image seen from the changed viewpoint is automatically created while the camera is kept fixed.

2. Partial Expansion or Compression of an Image

By utilizing depth information, the most natural and effective viewfinder image is automatically created through partial scaling as required.

3. Separation of an Image Area

For separating a desired image area, it is first necessary to fully recognize respective image areas. For area recognition, several methods have been proposed, including a clustering method, but they have had only unsatisfactory results. The present invention permits an accurate area separation in a totally different way from the conventional way, using depth information.

Since depth information is obtained through the same process as that in Embodiment 1, in the following, only Stage 4 (Creation of an Image) will be described, as it differs from Embodiment 1.

[Stage 4] Creation of an Image

A desired viewfinder image is created according to the depth information, which has been obtained at Stage 3. At stages up to Stage 3, at least two viewfinder image frames have been demanded in extracting necessary information, though it is possible to create a desired image based on only a single viewfinder image frame at Stage 4.

(1) A Viewfinder Image Seen from a Different Point

Figure 29:
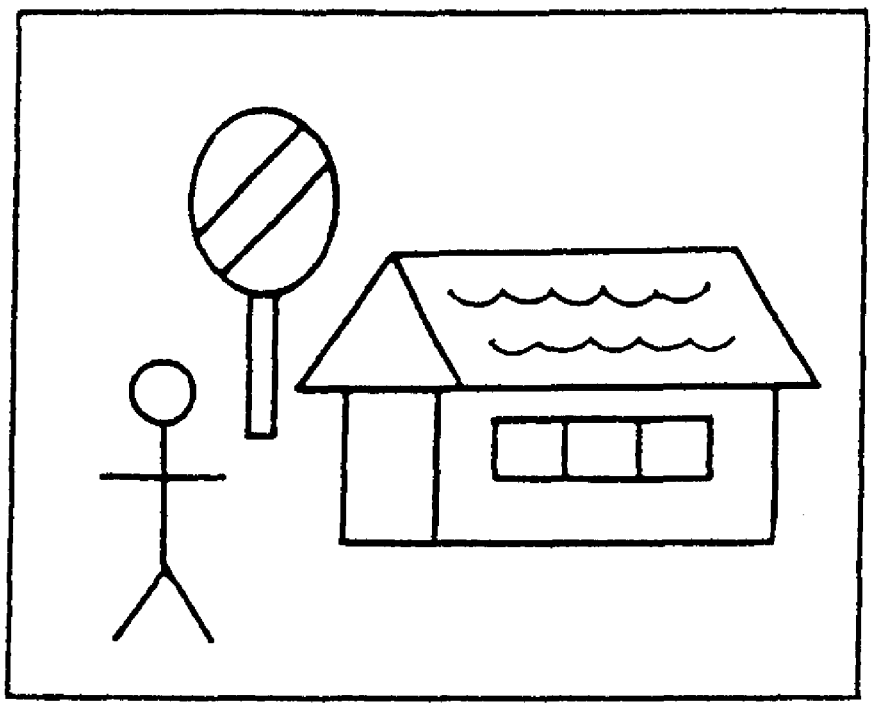
FIG. 29 shows a corresponding relationship of an original viewfinder image and one re-created so as to be seen from a changed viewpoint.
Figure 30:
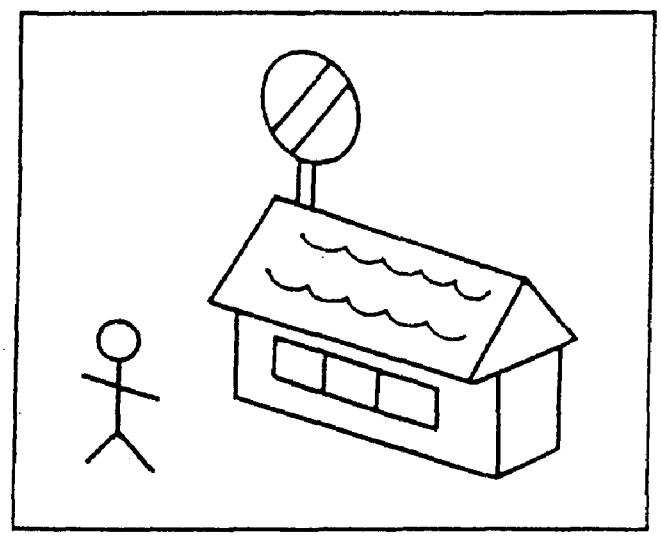
FIG. 30 shows a corresponding relationship of an original viewfinder image and one re-created so as to be seen from a changed viewpoint.

FIGS. 29 and 30 show a corresponding relationship between an original viewfinder image and one re-created so as to be seen from a changed viewpoint. FIG. 29 is the original viewfinder image, showing a tree, a house, and a person, each having a smaller depth in this order. FIG. 30 is the viewfinder image created with the assumption that its viewpoint is hypothetically moved to a point somewhere at the top right of the scene.

As is apparent from those drawings, according to the present invention, it is possible to obtain a viewfinder image seen from a different point while the camera is fixed, because 3-D information about the respective image parts has been known, including the depth information, from Stage 3. In this example, it was assumed that the viewpoint was moved up to the top right of the scene, although it can be understood that the object was moved down to the bottom left of the scene. The movement to the bottom left can be expressed in the form of translation and rotation movements, as described in Stage 3. By reversely following the processes at Stages 1 to 3, it is possible to compute a 2-D movement of the object on the screen, based on this hypothetical 3-D movement of the object, so as to create the viewfinder image shown in FIG. 30. Since no room is left for arbitrariness in the creation through Stages 1 to 4, the thus created viewfinder image is very natural.

In this stage, it is preferable to consider and reflect a masking relationship in creating an image. Concretely speaking, in FIG. 30 for example, accompanying a change of the viewpoint, the bottom part of the tree becomes obscured by the roof of the house. Therefore, for creating a natural viewfinder image, the bottom part of the tree should be covered by the image data of the house. In actual software processing, the creation should be started with an image part having a larger depth in order to create a natural viewfinder image. Alternatively, the Z-buffer technique, which is widely-used in computer graphics, can be used for this purpose. For obtaining a masking relationship through computation, a judgement is first made as to whether the sight vectors directed at the respective image parts from the changed viewpoint are overlaid on one another. When the sight vectors to Parts A and B are overlaid on each other, and Part A is located closer to the viewpoint than Part B, it is known that Part A should be seen as masking Part B. An image may be created based on the thus computed information.

(2) Partial Scaling of an Image

In an enhanced display, one of the image display techniques, a closer object may be re-positioned even closer, while a distant object may be made even more distant, so that the contrast in depth is emphasized between the objects.

Figure 31:
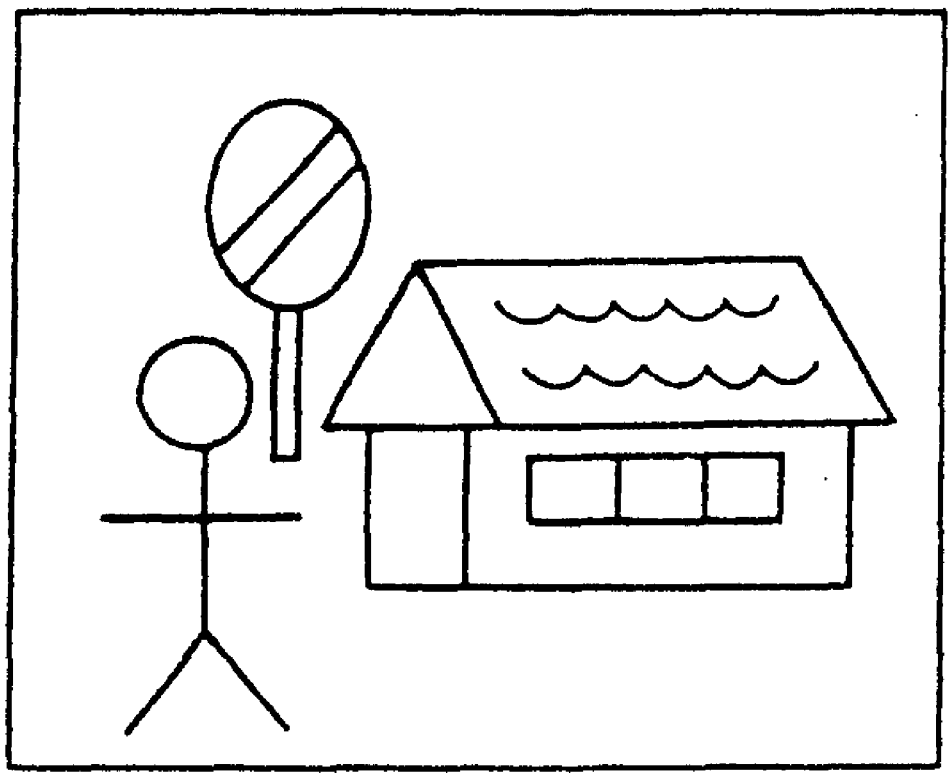
FIG. 31 shows an image with a part expanded.

For this image processing, according to the present invention, images are partially changed its scale based on depth information. FIG. 31 shows the same viewfinder image as FIG. 29, except that a part of it is magnified. As a result of the person being expanded, the person having the shortest depth among all objects in the drawing, the person is perceived as being much closer to the viewer. As a result, an effective enhanced display is achieved. In this case, preferably, a masking relationship is also reflected in the newly created viewfinder image.

It is to be noted that, in expanding an area with the shortest depth, there is no limitation in the magnifying ratio because that area can be expanded without a problem until it is perceived as having no depth at all. However, in magnifying an area having around a middle depth in the viewfinder image, that is, the house in FIG. 31, since it should not be perceived as being closer than the person, the magnifying ratio is accordingly restricted. Violation of such a restriction would result in an unnatural viewfinder image. In the expansion according to depth information, as is executed in the present invention, it is possible to make conditions such as that only areas with the shortest depth should be magnified, and only ones with the largest depth should be reduced, so as to create a natural and realistic image, that is, an image in compliance with the laws of nature.

In the above, methods have been described for creating a natural image, though unnatural images may sometimes be demanded, such as when the sense of unnaturalness needs to be emphasized with a larger display of a distant part than that of a closer part. Such an unnatural image may be used for games or the like. In any case, according to the present invention, the naturalness or unnaturalness can be freely created as desired. Conventionally, a natural image may or may not have been created as a result of an accident where the scale of some parts of the image were changed. However, according to the present invention, the creation of a natural or an unnatural image is ensured as requested.

Once a natural image is created, in order to further carry out the above described process (1) or a process (3) to be described later on the natural image created, it is preferable to begin the process by changing the depth of the expanded or compressed areas. For example, when an area is doubled in size, its depth should be halved. Contrary, when an area is halved in size, its depth should be doubled. This correction is necessary because the size of an area is inversely proportional to its depth. An image so corrected would ensure a natural image to be produced in the subsequent processes.

In conducting the image processing of the above (1) and (2), an image may be finalized by smoothing uneven parts along the edge of the image. For example, when re-creating the viewfinder image in FIG. 20 into that in FIG. 30, it will never happen that all image parts in FIG. 29 correspond to those in FIG. 30 with a one-by-one corresponding relationship. Concretely speaking, since the space shown at the top right corner of the image in FIG. 30 may show objects not seen at the same region of the image in FIG. 29. Therefore, in a naive creation of a viewfinder image of FIG. 30 based on that of FIG. 29, an image part to be shown at the region is actually broken off in FIG. 30. This break-off causes a recess with respect to the ideal edge line of the image. For the same reason, all image parts included in FIG. 29 are not shown within the ideal edge of the image in FIG. 30, while some image parts are projected from the edge.

In order to solve this problem and to maintain the original screen shape (rectangular in this example), such recesses are filled with extra pixels, while such projections are cut off with redundant pixels. The filling should be made with pixels having the same color as that of images in the adjacent region. When the above image processing (2) causes similar unevenness along the edge line of the image, a similar amendment would solve the problem. With this amendment, the edge line of the image is displayed natural.

(3) Separation of Image

A desired image part is separated to be individually processed. Referring to FIG. 29, it is assumed that the person, the house and the tree respectively have a depth of 3 m, 10 m, and 20 m. In order to separate the person only, a condition is made such as that "within five meters in depth" before starting the detection and judgement of the depths of the respective parts. In order to separate the house, the condition may instead be such, as "within five to fifteen meters in depth."

Figure 32:
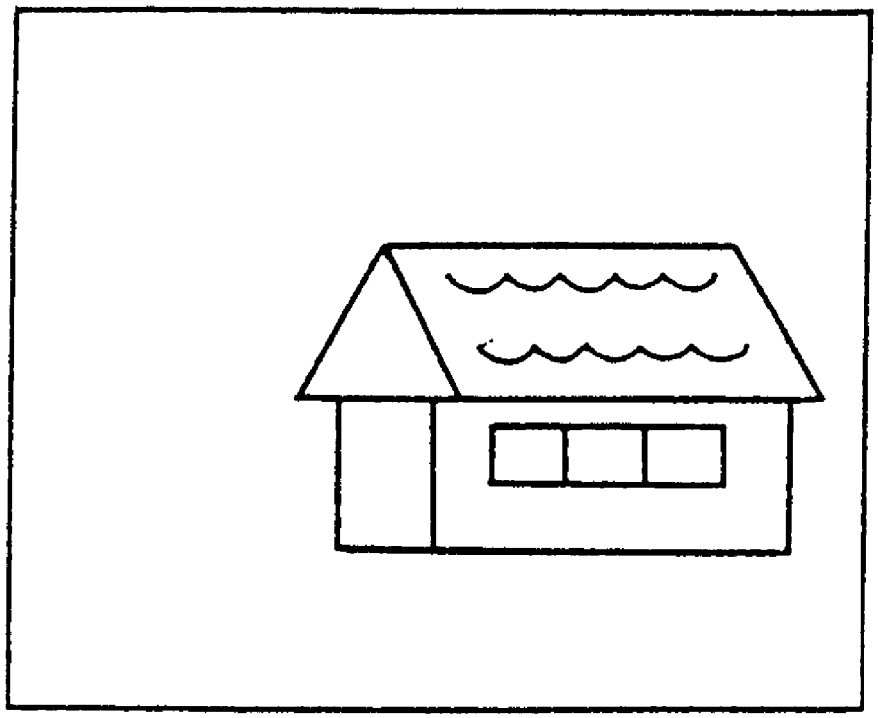
FIG. 32 shows an image with a house separated from the image in FIG. 29.

FIG. 32 is a viewfinder image created with the house separated from FIG. 29. After separating a desired image area, the rest may be left blank, or the separated area may be pasted on a different viewfinder image.

As described above, the present invention provides methods for image recognition and processing as well. Conventionally, image areas have been separated manually or by means of a clustering method using colors. The present invention provides a method for achieving an accurate area recognition in a totally different way from the conventional method, using depth information.

As described thus far, the present invention discloses a method for image processing using an accurate depth information. Since the series of processes can be fully automated with software, the present invention can be applicable over a wider range.

Embodiment 6.

An appropriate apparatus in practicing Embodiment 5 will be described, which is substantially the same as that described in Embodiment 2, except that it outputs a single type of image, instead of two types of images, that is, images for right and left eyes in Embodiment 2. The operation will next be described only in connection with structural differences from Embodiment 2. A camera shoots an object so as to capture its viewfinder image, which is supplied via the image input circuit 20 to be stored in the frame memory 24. A plurality of frames on a viewfinder image are read out from the frame memory 24 to be processed through the corresponding point detection circuit 26 and the motion detection circuit 30, for obtaining depth information of the object.

Subsequently, the image creation circuit 32 creates an image, such as a viewfinder image seen from a different point, according to the depth information. In this case, with an instruction supplied via the instruction input section 34, various processes will be carried out, including the creation of a viewfinder image seen from a different point, expansion, compression or separation, as described in Embodiment 5.

Embodiment 7.

A method for creating an image for a 2-D display when receiving a stereo viewfinder image will be described.

The difference between Embodiment 5 and 7 is the same as that between Embodiment 1 and 3. According to Embodiment 7, it is generally possible to obtain depth information with a high accuracy, and thereby achieve a highly accurate creation of a viewfinder image seen from a different point as a final image.

Embodiment 8.

Similarly to Embodiment 1, a method for displaying a good stereoscopic image, based on information about a depth and about a 2-D image, will be described. Embodiment 8 is different from Embodiment 1 in that it considers conditions unique to a display apparatus, when displaying images.

As disclosed in foregoing JP Publication No. Sho 55-36240, when given depth information, it is possible to create and display a stereo image, based on a 2-D image. That is, the sender transmits television image signals (2-D image signals) appended with depth information. The receiver, on the other hand, divides the received image signals into two groups. Then, the respective image parts of one of the two image signal groups are given some displacement according to the depth information, so as to create right and left eye images, respectively. The thus created images are displayed on a stereo image display apparatus, to achieve reproduction of a stereoscopic image.

In this case, it is necessary to consider the nature of a parallax. In other word, as has already been discussed in the above, since a parallax is based on an angular difference between sight vectors, the extent of which varies among display apparatus in different sizes by displacing even the same number of pixels, the parallax resultantly varies depending on the size of the display apparatus. Even assuming that the size is the same, the parallax still varies depending on the distance between the display apparatus and the viewer. Therefore, in order to embody the optimum 3-D effect, the extent of displacement should be determined individually according to the unique conditions of a display apparatus.

Figure 33:
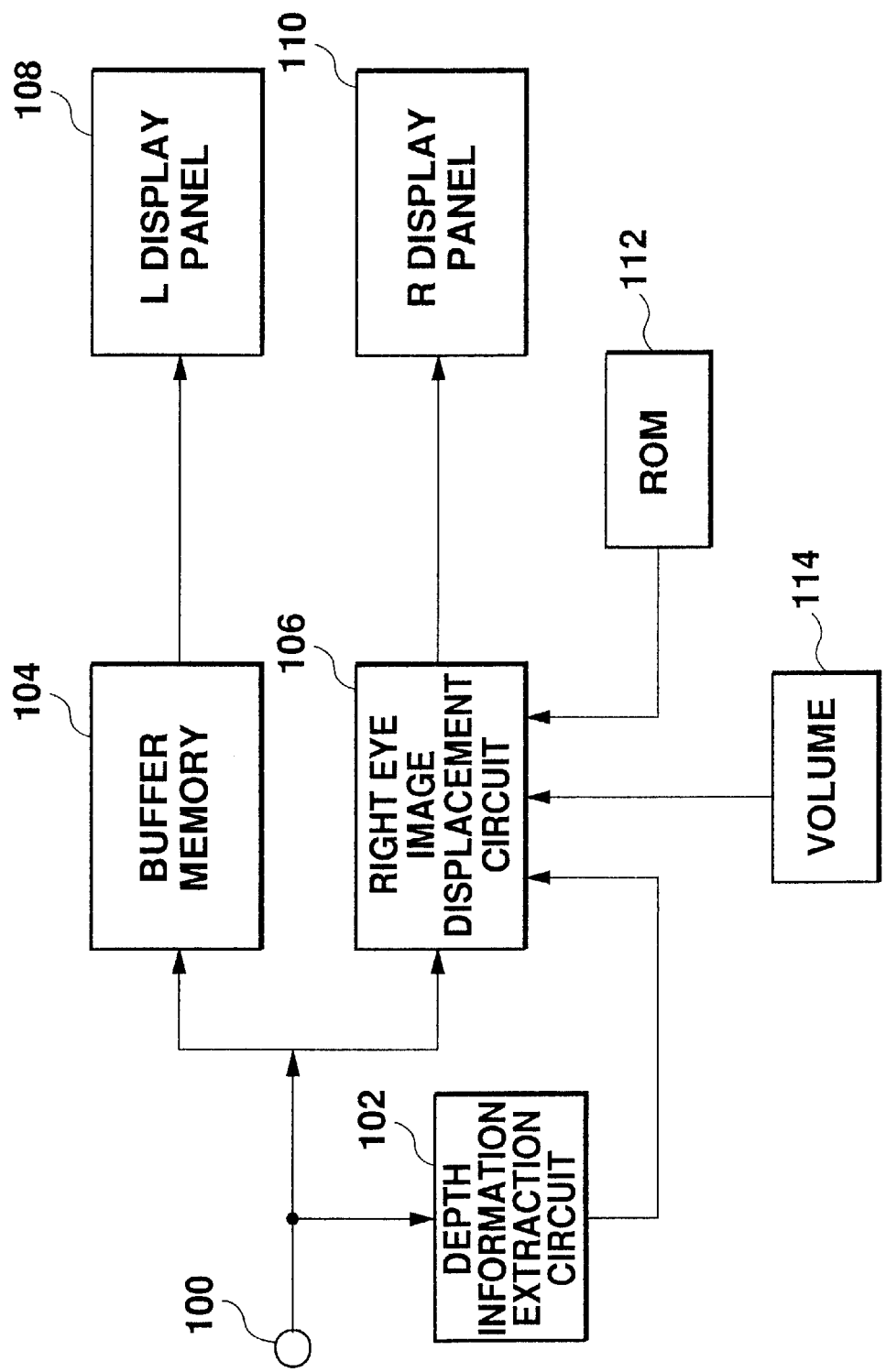
FIG. 33 shows a structure of a stereoscopic image display apparatus in Embodiment 8.

In Embodiment 8, the correction value unique to each stereo image display apparatus is introduced in addition to depth information. FIG. 33 shows a structure of a stereo image display apparatus according to Embodiment 8, in which a 2-D image and depth information are supplied via an input terminal 100, and the latter is extracted in a depth information extraction circuit 102 by a known method.

The 2-D image, on the other hand, is divided into two groups. One is supplied to a buffer memory 104, and the other is supplied to a right eye image displacement circuit 106. The buffer memory absorbs a delay caused in the displacement circuit 106. A Left eye display panel 108 displays an image transmitted from the buffer memory 104, while a right eye display panel 110 displays an image given a displacement in the displacement circuit 106.

This apparatus is characteristic in that the displacement circuit 106 determines the extent of displacement with reference to not only depth information but also to parameters unique to the apparatus, the parameters being pre-stored in a ROM 112. The ROM 112 stores the optimum correction value for the apparatus, which is in compliance to the following general rules.
(1) Relating to the size of a display panel: for a smaller display panel, a larger value is stored.
(2) Relating to the distance from a display panel to a viewer in an ordinary use: for a smaller distance, a smaller value is stored.

The display circuit 106 gives a larger displacement if a depth is smaller or a correction value is larger, the correction value being predetermined according to the above mentioned rules. As a result, the optimum stereoscopic display is achieved, which reflects the conditions unique to the display apparatus.

Embodiment 8 may also be applied with the following technical variations.
1. As shown in FIG. 33, a volume 114 may be provided for manually changing the extent of displacement, so that a supplementary adjustment or an adjustment according to a personal preference can be performed.
2. Displacement may be given to both right and left images.
3. As is described in the foregoing Nikkei Electronics No. 444, a 3-D effect may be created using a Pulfrich effect.
4. The ROM 112 may have pre-stored therein a plurality of correction values, so as to be selected for use depending on the situation.
5. Correction values may be stored in two groups, one being changed depending on the screen size, the other being changed depending on the distance between the display and the viewer.
6. In the description above, the value of depth information is accurately proportional to the distance between the shooting position and the object. However, depth information may show the absolute distance between the shooting position and the object. A simple case will be taken as an example, where depth information comprises only three distinctions: that is, large, medium, and small. When depth information indicates "large" or a long distance, no displacement is made to cause no parallax to the image part. When "medium" or a medium instance is indicated, some displacement is made to cause a parallax to the image part. When "small" or a small distance is indicated, a large displacement is made to cause a large parallax to the image part.

The thus simplified depth information could reduce the volume of transmission data for broadcasting, in addition to achieve a circuit having a simple structure for a stereo image display apparatus.

What is claimed is:

1. A method for calculating depth information, based on frames included in a 2-D image, comprising:
   a step of selecting two frames with an appropriately large movement between the two frames within the 2-D motion image;
   a step of calculating depth information, based on the two frames, wherein the calculation of the depth information is discontinued when two frames with an appropriately large movement between the two frames cannot be selected from the 2-D motion image;
   a step of providing a plurality of representative points in a reference frame;
   a step of determining a plurality of corresponding points in another frame, the corresponding points determined to correspond to each of the representative points;
   a step of obtaining a positional relationship between the representative and corresponding points;
   each of the representative points being classified either as a characteristic or a non-characteristic point;
   wherein when more that a predetermined number of characteristic points move between the reference frame and the other frame and a total of the movements of the characteristic points exceed a predetermined value, it is judged that a movement between the reference frame and the other frame is appropriately large, and the reference frame and the other frame are selected; and
   the step of adjusting a position in a second frame of a corresponding point of a representative point within a first frame, the representative point positioned within an image area of the first frame having a geometric characteristic, the position of the corresponding point adjusted to retain the geometric characteristic of the image formed in the second frame.

2. A method for calculating depth information according to claim 1, wherein
   the image area having a geometric characteristic is an area including a straight line.

3. A method for calculating depth information, comprising:
   a step of providing a plurality of representative points in a reference frame;
   a step of evaluating image similarity between an image area including specific points which are arbitrarily set in another frame, and a nearby image area including the representative points in the reference frame;
   a step of evaluating relative positional acceptability among the specific points;
   a step of determining the specific points as corresponding points of the representative points in response to the evaluations of image similarity and relative positional acceptability;
   a step of searching for an updated corresponding point position by moving one of the corresponding points with all the other corresponding points fixed at their current positions and evaluating the image similarity and the relative positional acceptability for the updated corresponding point position;
   a step of conducting a positional change of the one of the corresponding points to the updated corresponding point position;
   repeating the steps of searching and conducting the positional change with respect to remaining ones of the corresponding points; and
   a step of calculating the depth information according to a positional relationship between the representative points and the corresponding points, the corresponding points having been determined through a series of the above steps.

4. A method for calculating depth information according to claim 3, the method further comprising, performed after the steps of searching and conducting the positional change are conducted for all of the corresponding points, a step of solving an Euler-Lagrange differential equation to identify a condition where a combined value of both the evaluations of image similarity and relative positional acceptability is an extremum.

5. A method for calculating depth information of a 2-D image, the method comprising the steps of:
   calculating depth values for a plurality of points within the 2-D image:
   evaluating the calculated depth values to identify negative values in the calculated depth values; and
   calculating a replacement depth value for each negative value point having a negative calculated depth value, the replacement depth value being interpolated using depth information of points having positive depth values adjacent the negative value point.

6. A method for image processing using depth information, comprising:

a step of obtaining a parallax for a plurality of pixels within a 2-D image according to depth information;

a step of individually modifying the parallax for each of the plurality of pixels obtained to be within a predetermined range, the modified parallax determined in consideration of other information different from the depth information; and a step of creating a stereo image according to the modified parallax, wherein the other information includes any one of viewer information, processing data amount information and information which suggests that an image is formed in front of a display screen by more than a predetermined distance.

7. A method for image processing according to claim 6, wherein the parallax is linearly compressed to produce the modified parallax which falls within the predetermined range.

8. A method for image processing according to claim 6, wherein the parallax outside of the predetermined range is uniformly transformed to provide a modified parallax having a value closer to either an upper or a lower limitation value of the predetermined range.

9. A method for image processing according to claim 6, wherein the parallax is non-linearly transformed and transformed values smoothly converge to upper or lower limitation values of the predetermined range and fall within the predetermined range.

10. A method for image processing using depth information, comprising:

a step of determining an initial parallax value according to depth information for image elements within a 2-D image;

a step of adjusting a parallax value from the initial parallax value to an adjusted parallax value according to a display condition characteristic of a stereo image display apparatus;

a step of creating a stereo image by giving a parallax to a 2-D image according to the adjusted parallax value; and a step of displaying the stereo image on the stereo image display apparatus.

11. A method for image processing according to claim 10, wherein the display condition is determined according to a size of a display screen of the stereo image display apparatus and an assumed distance from the display screen to a viewer, and the process conducted to adjust the parallax value for the 2-D image is based on the determined display condition.

12. A method for image processing a 2-D image according to its depth information, the method comprising:

a step of detecting positional differences of corresponding points in two different frames representative of the 2-D image;

a step of determining depth information based on the positional differences and camera positions for shooting the frame for the multiple part in the image; and a step of selecting a target image part for further image processing according to the determined depth information, wherein the image processing is a process for changing a size of a first image area, and the first image area is at a first depth and a second image area is at a second depth greater than the first depth and wherein the process for changing a size of the first image area changes the size of the first image area by a proportionally larger extent than the process for changing a size of the second image area changes the size of the second image area.

13. A method for image processing using depth information, comprising:

a step of creating a stereo image by giving a parallax for every image part of a 2-D image according to depth information for the image part and generating an uneven image frame outline by creating the stereo image; and a step of correcting the uneven image frame outline, wherein the step of correcting the uneven image frame outline comprises the steps of:

identifying a deformed portion of an image shape; and inserting one or more pixels of data into a portion of the 2-D image associated with the deformed portion and the image shape to smooth the uneven image frame outline.

* * * * *